(12) United States Patent
Du

(10) Patent No.: US 9,706,428 B2
(45) Date of Patent: Jul. 11, 2017

(54) RADIO COMMUNICATION SYSTEM, RADIO COMMUNICATION METHOD, AND BASE STATION APPARATUS

(71) Applicant: FUJITSU LIMITED, Kawasaki-shi, Kanagawa (JP)

(72) Inventor: Haiqing Du, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 254 days.

(21) Appl. No.: 14/290,887

(22) Filed: May 29, 2014

(65) Prior Publication Data

US 2015/0024756 A1 Jan. 22, 2015

(30) Foreign Application Priority Data

Jul. 19, 2013 (JP) ................................ 2013-150593

(51) Int. Cl.
*H04W 36/00* (2009.01)
*H04W 28/02* (2009.01)
*H04W 36/32* (2009.01)

(52) U.S. Cl.
CPC ....... *H04W 28/0226* (2013.01); *H04W 36/32* (2013.01); *H04W 36/0083* (2013.01)

(58) Field of Classification Search
CPC ................................................. H04W 28/0226
See application file for complete search history.

(56) References Cited

U.S. PATENT DOCUMENTS

| 2007/0123265 A1* | 5/2007 | Moon | ................... | H04W 36/04 |
| | | | | 455/449 |
| 2009/0005047 A1* | 1/2009 | Gupta | ............... | H04W 36/0016 |
| | | | | 455/437 |

(Continued)

FOREIGN PATENT DOCUMENTS

| JP | 2006-5597 | 1/2006 |
| JP | 2010-252335 | 11/2010 |

(Continued)

OTHER PUBLICATIONS

JPOA—Office Action issued for corresponding Japanese Patent Application No. 2013-150593 dated Feb. 7, 2017, with full Machine translation.

(Continued)

*Primary Examiner* — Justin Lee
(74) *Attorney, Agent, or Firm* — Fujitsu Patent Center

(57) ABSTRACT

A radio communication system including a base station apparatus which includes a first communicable area; and a terminal apparatus which connects to and performs radio communication with the base station apparatus in the first communicable area, wherein the base station apparatus includes a determination unit which decides a destination of the terminal apparatus based on a changeable movement condition according to sizes of the first, a second, and a third communicable areas or power residual quantity of the terminal apparatus transmitted from the terminal apparatus, when the terminal apparatus moves from the first communicable area to the second or the third communicable area whose size is different from the first communicable area and which is overlapped with a part or all of the first communicable area; the terminal apparatus includes a reception unit which receives the information of the decided destination.

11 Claims, 19 Drawing Sheets

(56) References Cited

U.S. PATENT DOCUMENTS

| | | | |
|---|---|---|---|
| 2009/0117905 A1 | 5/2009 | Watanabe et al. | |
| 2011/0244859 A1 | 10/2011 | Tsuda | |
| 2012/0295626 A1 | 11/2012 | Kitaji | |
| 2015/0208314 A1* | 7/2015 | Lorca Hernando | ... H04W 36/32 455/441 |

FOREIGN PATENT DOCUMENTS

| | | |
|---|---|---|
| JP | 2011-155401 | 8/2011 |
| JP | 2011-217058 | 10/2011 |
| WO | 2008/001452 | 1/2008 |

OTHER PUBLICATIONS

JPOA—Office Action issued for corresponding Japanese Patent Application No. 2013-150593 dated May 9, 2017, with full machine translation.

* cited by examiner

RADIO COMMUNICATION SYSTEM 100

| PRIORITY ORDER | CellID | RECEIVING LEVEL |
|---|---|---|
| 1 | 5 | -81dBm |
| 2 | 3 | -83dBm |
| 3 | 2 | -84dBm |
| 4 | 1 | -85dBm |
| 5 | 4 | -93dBm |
|  | ... | ... |

| CellID | CELL CHARACTERISTIC | CODE |
|---|---|---|
| 1 | OUTDOOR/Macro | A |
| 2 | OUTDOOR/Femto(Public) | C |
| 3 | INDOOR/Femto(CSG) | F |
| 4 | INDOOR/Femto(Public) | G |
| 5 | OUTDOOR/Micro | B |
|  | ... | ... |

FIG. 8A

| CELL CHARACTERISTIC | OUTDOOR STATION | | | INDOOR STATION | | | |
|---|---|---|---|---|---|---|---|
| | Macro | Micro | Femto (Public) | Macro | Micro | Femto | |
| | | | | | | CSG | Public |
| CODE | A | B | C | D | E | F | G |

| HO PATTERN (CELL CHARACTERISTIC AND HO DIRECTION) | ALGORITHM |
|---|---|
| A→B | (1) |
| B→A | (2) |
| A→C | (3) |
| B→F | (4) |
| G→F | (5) |
| ... | ... |

| PRIORITY ORDER | CellID | RECEIVING LEVEL |
|---|---|---|
| 1 | 5 | −86dBm |
| 2 | 3 | −87dBm |
| 3 | 2 | −88dBm |
| 4 | 1 | −90dBm |
| 5 | 4 | −91dBm |
|  | ... | ... |

| PRIORITY ORDER | CellID | RECEIVING LEVEL |
|---|---|---|
| 1 | 5 | −81dBm |
| 2 | 3 | −83dBm |
| 3 | 2 | −84dBm |
| 4 | 1 | −85dBm |
| 5 | 4 | −93dBm |
|  | ... | ... |

| REPORT VALUES OF TERMINAL BATTERY RESIDUAL QUANTITY | 0-10% | 10-30% | 30-50% | 50% OR MORE |
|---|---|---|---|---|
| ALGORITHM | (1) | (2) | (3) | (4) |

| CELL CHARACTERISTIC | OUTDOOR STATION | | | INDOOR STATION | | | 1131 |
|---|---|---|---|---|---|---|---|
| | Macro | Micro | Femto (Public) | Macro | Micro | Femto | |
| | | | | | | CSG | Public |
| CODE | A | B | C | D | E | F | G |

| BATTERY RESIDUAL QUANTITY | PATTERN (CELL CHARACTERISTIC AND HO DIRECTION) | ALGORITHM |
|---|---|---|
| <10% | ARBITRARY PATTERN | (1) |
| 10~30% | ARBITRARY PATTERN | (2) |
| 30~50% | LARGE CELL→SMALL CELL | (3) |
| | SMALL CELL→LARGE CELL | (4) |
| >50% | LARGE CELL→SMALL CELL | (5) |
| | SMALL CELL→LARGE CELL | (6) |

FIG. 17A

| PRIORITY ORDER | CellID | RECEIVING LEVEL |
|---|---|---|
| 1 | 5 | -86dBm |
| 2 | 3 | -87dBm |
| 3 | 2 | -88dBm |
| 4 | 1 | -90dBm |
| 5 | 4 | -91dBm |
| | ... | ... |

| CellID | CELL CHARACTERISTIC | CODE |
|---|---|---|
| 1 | OUTDOOR/Macro | A |
| 2 | OUTDOOR/Femto(Public) | C |
| 3 | INDOOR/Femto(CSG) | F |
| 4 | INDOOR/Femto(Public) | G |
| 5 | OUTDOOR/Micro | B |
| | ... | ... |

| CELL CHARACTERISTIC | OUTDOOR STATION | | | INDOOR STATION | | | |
|---|---|---|---|---|---|---|---|
| | Macro | Micro | Femto (Public) | Macro | Micro | Femto | |
| | | | | | | CSG | Public |
| CODE | A | B | C | D | E | F | G |

| THROUGHPUT REQUEST | PATTERN (CELL CHARACTERISTIC AND HO DIRECTION) | ALGORITHM |
|---|---|---|
| <1Mbps | ARBITRARY PATTERN | (1) |
| 1~3Mbps | ARBITRARY PATTERN | (2) |
| 3~5Mbps | A→B | (3) |
| | A→C | (4) |
| | B→A | (5) |
| | B→C | (6) |
| | ... | ... |
| >5Mbps | A→B | (7) |
| | A→C | (8) |
| | B→A | (9) |
| | B→C | (10) |

1135

RADIO COMMUNICATION SYSTEM, RADIO COMMUNICATION METHOD, AND BASE STATION APPARATUS

CROSS-REFERENCE TO RELATED APPLICATION

This application is based upon and claims the benefit of priority of the prior Japanese Patent Application No. 2013-150593, filed on Jul. 19, 2013, the entire contents of which are incorporated herein by reference.

FIELD

The embodiments discussed herein are related to a radio communication system, a radio communication method, and a base station apparatus.

BACKGROUND

A radio mobile communication system such as a mobile telephone system and a wireless LAN (Local Area Network) is in wide use today. In order to further improve communication speed and communication capacity in the field of radio mobile communication, continuous discussion is in progress on next-generation communication technology. For example, standardization of communication standards for LTE (Long Term Evolution), LTE-A (LTE-Advanced), etc. has been completed or is currently under study in the 3GPP (3rd Generation Partnership Project) which is an association for standardization.

In such a radio communication system, attention is being paid on a network called HetNet (Heterogeneous Network). For example, HetNet is a hierarchical network of a variety of cell sizes, including a macro cell, a pico cell, and a micro cell. In each cell, radio communication is carried out using different radio communication methods (such as LTE and 3G) with different frequency bands. By hierarchized cells, the HetNet can improve total capacity of a mobile communication system.

Meanwhile, in the radio communication system, there is a technique called handover (or handoff). Handover is a technique to perform radio communication while a terminal apparatus switches over a base station apparatus to be connected to. By the handover, the terminal apparatus can perform continuous radio communication.

As a technique related to such radio communication, there is a technique as described below, for example.

Namely, in a radio mobile communication system in which a hierarchical cell structure is adopted, there is a technique such that a mobile station apparatus selects a destination cell by comparing a predetermined time before the number of times of cell selection and/or cell reselection in a certain time reaches a certain value with a threshold, so as to be shifted to a standby state.

According to the above technique, for example, it is said that each mobile station apparatus can be placed in a cell area having an appropriate size according to a traveling speed and a cell structure.

Further, in a heterogeneous access system, there is a technique of observing service quality (QoS) measured by an access system currently in connection, to search and select an optimal access system for the service concerned when QoS falls down to a preset threshold or lower.

According to the above technique, for example, in a mobile network environment in which heterogeneous access systems are mixed, it is said that a method and an apparatus for selecting an optimal access system can be provided.

Furthermore, there is a technique for a communication control apparatus to control handover by a terminal apparatus, in which, for each cell identified by a cell ID included in a position information history, a cell ID that is not appropriate for the terminal apparatus to connect to is removed from the position information history.

According to the above technique, it is said that an order to switch over a cell to which the terminal apparatus is connected by handover can be optimized.

PATENT DOCUMENTS

[Patent document 1] International Publication Pamphlet No. WO 2008/001452.
[Patent document 2] Japanese Laid-open Patent Publication No. 2010-252335.
[Patent document 3] Japanese Laid-open Patent Publication No. 2011-217058.

In the HetNet, a small cell such as micro cell, pico cell, femto cell having a smaller cell range than a macro cell exists in the macro cell. Therefore, even when a terminal apparatus is moving within a macro cell, a handover may occur when the terminal apparatus moves into a small cell within the macro cell. This causes more frequent occurrence of handover at the terminal apparatus, as compared to a radio communication system of a non-HetNet configuration. By this, in the HetNet, there are increased messages related to handover between the terminal apparatus and the base station apparatus, which may possibly result in the degradation on the processing capability of the base station apparatus. Additional installation of a base station apparatus to cope with such a case produces increased cost of the total network, thus imposes a burden on the operator that operates the base station apparatus.

In the above-mentioned technique of selecting a destination cell by the comparison of a predetermined time for the number of cell reselection times to reach a certain value with a threshold, there is a case that the cell reselection etc. may be performed a lot of times until the mobile station apparatus becomes a standby state and moves to an appropriate cell.

Therefore, according to this technique, the mobile station apparatus may perform cell reselection etc. many times, causing frequent occurrence of handover between with hierarchized cells and an increased number of handover messages. Also, according to the technique, increased handover messages may deteriorate the throughput due to ineffective use of a radio resource for the transmission of data etc.

Further, in the technique for searching an optimal access system when QoS falls down to a preset threshold or lower, there has been no disclosure on how to cope with increased handover messages in the HetNet. Also, in the technique for removing a cell ID that is inappropriate for connection to the terminal apparatus from the position information history, there is no disclosure on how to cope with increased handover messages in the HetNet.

Therefore, since no disclosure has been given in the above-mentioned techniques about measures against the increase of handover messages, there may be cases of increased cost of the base station apparatus and reduced total throughput of the radio communication system.

SUMMARY

According to an aspect of the embodiments, a radio communication system including: a base station apparatus which includes a first communicable area; and a terminal apparatus which connects to and performs radio communication with the base station apparatus in the first communicable area, wherein the base station apparatus includes: a determination unit which decides a destination of the terminal apparatus based on a changeable movement condition on handover according to sizes of the first, a second, and a third communicable areas or information on the remaining battery power of the terminal apparatus, transmitted from the terminal apparatus, when the terminal apparatus moves from the first communicable area to the second or the third communicable area whose size is different from the first communicable area and which is overlapped with a part or all of the first communicable area; and a transmission unit which transmits information of the decided destination, the terminal apparatus includes: a reception unit which receives the information of the decided destination, and the terminal apparatus moves to the second or the third communicable area according to the information of the decided destination.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7A and FIG. 7B illustrate examples of tables.

FIG. 8A and FIG. 8B illustrate examples of tables.

FIG. 11 illustrates an example of a table.

FIG. 12A and FIG. 12B illustrate examples of tables.

FIG. 15A and FIG. 15B illustrate examples of tables.

FIG. 17A and FIG. 17B illustrate examples of tables.

FIG. 18A and FIG. 18B illustrate examples of tables.

DESCRIPTION OF EMBODIMENTS

Hereafter, embodiments to implement the present invention will be described.

First Embodiment

Figure 1:
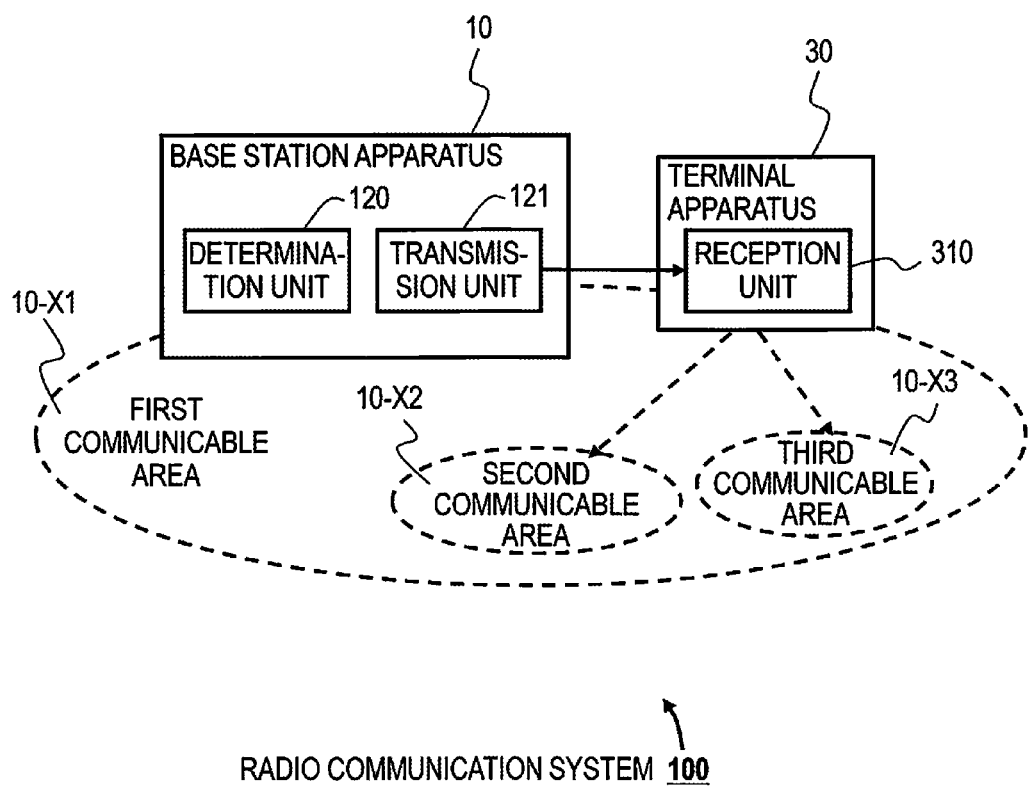
FIG. 1 illustrates a configuration example of a radio communication system.

First, a description will be given on a first embodiment. FIG. 1 illustrates a configuration example of a radio communication system 100 according to the first embodiment.

The radio communication system 100 includes a base station apparatus 10 and a terminal apparatus 30.

The base station apparatus 10 includes a first communicable area 10-X1. The terminal apparatus 30 connects to the base station apparatus 100 in the first communicable area 10-X1 to perform radio communication.

The base station apparatus 10 also includes a determination unit 120 and a transmission unit 121.

When the terminal apparatus 30 moves from the first communicable area 10-X1 to a second or a third communicable area 10-X2, 10-X3, the determination unit 120 decides a destination of the terminal apparatus 30, on the basis of a movement condition that can be changed according to the size of the first to third communicable areas 10-X1 to 10-X3.

Also, when the terminal apparatus 30 moves from the first communicable area 10-X1 to the second or third communicable area 10-X2, 10-X3, the determination unit 120 decides the destination of the terminal apparatus 30, on the basis of a movement condition that can be changed according to the information on remaining battery power of the terminal apparatus 30, transmitted from the terminal apparatus 30.

Each of the above second to third communicable areas 10-X2, 10-X3 is of a different size from the first communicable area 10-X1, and is located in an area overlapped with a part or all of the first communicable area 10-X1. With such properties of the first to third communicable areas 10-X1 to 10-X3, for example, a HetNet configuration of the present radio communication system 100 is generated.

The transmission unit 121 transmits information of the decided destination to the terminal apparatus 30.

The terminal apparatus 30 includes a reception unit 310. The reception unit 310 receives the destination information decided by the base station apparatus 10. Based on the above information, the terminal apparatus 30 moves to the second or third communicable area 10-X2, 10-X3.

For example, the movement condition is changeable by the operation of the base station apparatus 10 from an operator that administers the base station apparatus 10. Accordingly, as compared to a case when the movement condition is uniformly decided, the present radio communication system 100 can set the movement condition in which the operating condition of the operator is reflected. In this case, since the movement condition can be changed without newly adding an apparatus to the base station apparatus 10, for example, cost increase can be avoided.

Also, in regard to the above movement condition, as compared to a movement direction from the second or third communicable area 10-X2, 10-X3 to the first communicable area 10-X1, a different condition is settable for a movement direction from the first communicable area 10-X1 to the second or third communicable area 10-X2, 10-X3, for example.

The movement condition can be changed according to the size of the first to third communicable areas 10-X1 to 10-X3, for example. Also, the movement condition can be changed according to the information on remaining battery power of the terminal apparatus 30, transmitted from the terminal apparatus 30.

By this, as compared to the case of a uniform movement condition for example, it is possible to set the movement condition that makes the handover of the terminal apparatus 30 difficult, according to the size of the second or third communicable area 10-X2, 10-X3 or the information on remaining battery power of the terminal apparatus 30. Thus, a handover frequency of the terminal apparatus 30 can be reduced.

Thus, it is possible to reduce messages to be exchanged between the terminal apparatus 30 and the base station apparatus 10 accompanying the movement of the terminal apparatus 30, and in accordance therewith, to increase a data exchange amount between the terminal apparatus 30 and the base station apparatus 10, as well as to improve a throughput.

Second Embodiment

Next, a description will be given on a second embodiment. First, a configuration example of a radio communication system according to the second embodiment will be described.

<Configuration Example of Communication Network System>

Figure 2:
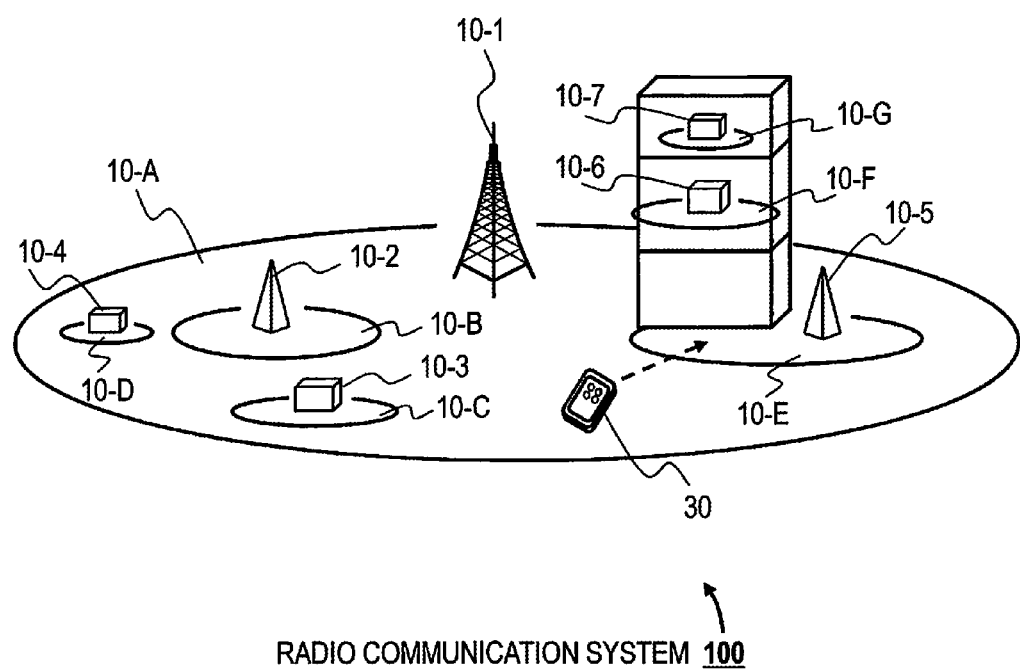
FIG. 2 illustrates a configuration example of a radio communication system.

FIG. 2 illustrates a configuration example of a radio communication system 100 according to the second embodiment. The radio communication system 100 includes base station apparatuses (hereafter may be referred to as base stations) 10-1 to 10-7 and each terminal apparatus (hereafter may be referred to as terminal) 30.

The present radio communication system 100 is a HetNet (Heterogeneous Network) radio communication system, for example. HetNet is a network constituted by radio communication systems whose cells of respectively different sizes or ranges are hierarchized. In the HetNet, for example, each cell performs radio communication using a radio communication method different from other cells (such as LTE and 3G) and a different frequency band.

Here, cell signifies a communication range or a communication area in which each base station 10-1 to 10-7 can perform radio communication with (or can provide a service for) the terminal 30, for example. However, there may also be cases hereafter that the term "cell" is used to signify the same as "base station 10-1 to 10-7".

In the example of the radio communication system 100 depicted in FIG. 2, the base station 10-1 includes a macro cell 10-A, while the base stations 10-2, 10-5 include micro cells 10-B, 10-E, respectively. Also, the base station 10-3, 10-6 include pico cells 10-C, 10-F, respectively, and the base station 10-4, 10-7 include femto cells 10-D, 10-G, respectively.

In the example depicted in FIG. 2, the macro cell 10-A has the largest cell size (dimension or range), and the cell size decreases in order from the micro cells 10-B, 10-E to the pico cells 10-C, 10-F, so that the femto cells 10-D, 10-G are the smallest in size.

Further, in the example depicted in FIG. 2, the micro cell 10-B, the pico cell 10-C and the femto cell 10-D are respectively located in the area of the macro cell 10-A. As such, in the HetNet, a part of or all areas of cells of different sizes are located in the same area in an overlapped manner, to form a hierarchical cell layout. Also, the pico cell 10-F and the femto cell 10-G are located in the micro cell 10-E to form a hierarchical cell layout.

Further, although FIG. 2 illustrates an example in which each base station 10-1 to 10-7 includes each single cell 10-A to 10-G, it may also be possible that a single base station 10-1 includes the plurality of cells 10-A to 10-G.

The example depicted in FIG. 2 illustrates a state that the terminal 30 is handed over from the macro cell 10-A to the micro cell 10-E. By the handover of the terminal 30 from the macro cell 10-A to the micro cell 10-E, the number of terminals currently accommodated in the base station 10-1 decreases, whereas the number of terminals that can be accommodated in the base station 10-1 increases. By this, for example, the total capacity of the radio communication system 100 can be increased.

Here, the terminal 30 may be handed over from the macro cell 10-A having the largest cell size to one of the micro cell 10-B, the pico cell 10-C and the femto cell 10-D having a smaller cell size than the macro cell 10-A, or may be handed over in the reverse direction. Also, the terminal 30 may be handed over from the micro cell 10-E to the pico cell 10-F or the femto cell 10-G, or may be handed over from the pico cell 10-F to the femto cell 10-G, or may be handed over in the reverse direction.

As such, in the HetNet radio communication system 100, each base station 10-1 to 10-7 permits handover from a handover source cell to a handover destination cell, all or a part of which overlays with the handover source cell. By such cell in overlapped area, the cell is hierarchized, for example. Although the example depicted in FIG. 2 illustrates a case in which other cells 10-B to 10-G are accommodated inside the macro cell 10-A, for example, each of the other cells 10-B to 10-G may be located to overlap with a part of the macro cell 10-A.

Each base station 10-1 to 10-7 is a radio communication apparatus that performs radio communication with each terminal 30 located in each cell 10-A to 10-G. The base station 10-1 to 10-7 provides each terminal 30, located in each cell 10-A to 10-G, with a variety of services including speech communication, video distribution and access to a Web page.

Further, each base station 10-1 to 10-7 is interconnected through a network, to transmit or receive data etc. to/from the other base stations, for example. Also, each base station 10-1 to 10-7 is connected to an upper-level apparatus through a network, and can transmit data etc. transmitted from the upper-level apparatus, to the terminal 30 through a downward communication link, and also can transmit data etc. transmitted from the terminal 30, to the upper-level apparatus through an upward communication link.

The terminal 30 is a radio communication apparatus performing radio communication with the base stations 10-1 to 10-7, for example. The terminal 30 is a feature phone, a smartphone, etc., for example.

The radio communication system 100 depicted in FIG. 2 is one example. There is no limitation in the number of base stations 10-1 to 10-7 as long as the HetNet is configured. Also, the terminal 30 may be plural in number.

<Regarding Cell ID>

Figure 3:
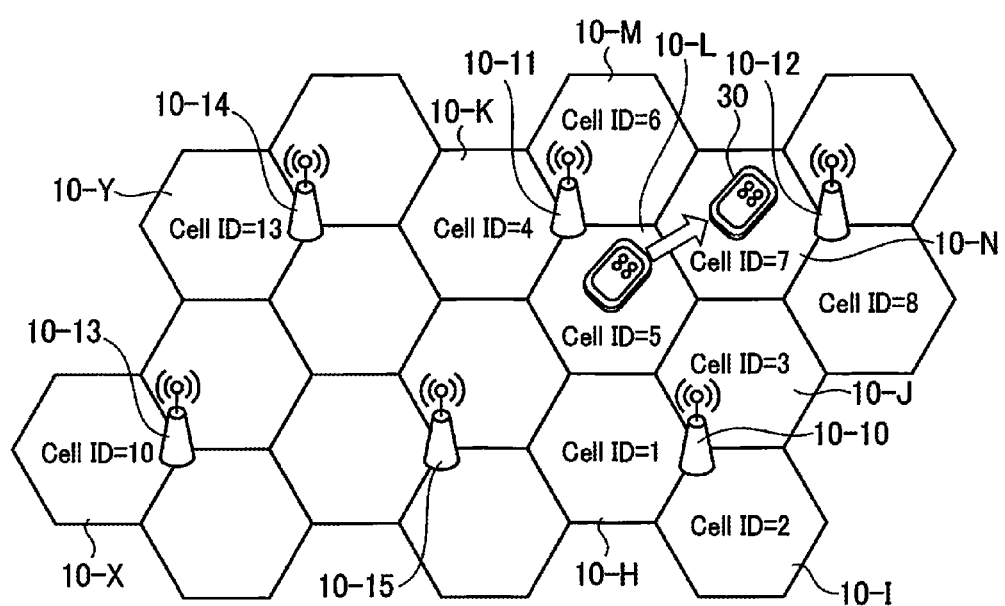
FIG. 3 illustrates an example of a cell configuration.

Next, a description will be given on cell ID. FIG. 3 illustrates an exemplary cell configuration. Here, the cell configuration depicted in FIG. 3 is not a HetNet configuration.

As depicted in FIG. 3, a base station 10-10 includes three cells 10-H to 10-J, and each cell ID of "1" to "3" is allocated to each cell 10-H to 10-J. Cell ID is an identifier to identify the self-cell from other cells, and in the present second embodiment, each number is allocated for identification, for example.

A base station 10-11 includes cells 10-K to 10-M, and each cell ID of "5" to "7" is allocated to each cell. Such a cell ID is allocated uniquely to each cell at cell design before the installation of the base stations.

The example depicted in FIG. 3 illustrates a state that the terminal 30 is moving from a cell 10-L, whose cell ID is "5", of the base station 10-11, to a cell 10-N, whose cell ID is "7", of a base station 10-12.

Here, although each base station 10-10 to 10-15 includes three cells, the number of cells may be single or plural. Also, the example depicted in FIG. 2 illustrates a case when each base station 10-1 to 10-7 includes a single cell, it may also be possible that each base station includes a plurality of cells.

<Configuration Example of Base Station 10>

Figure 4:
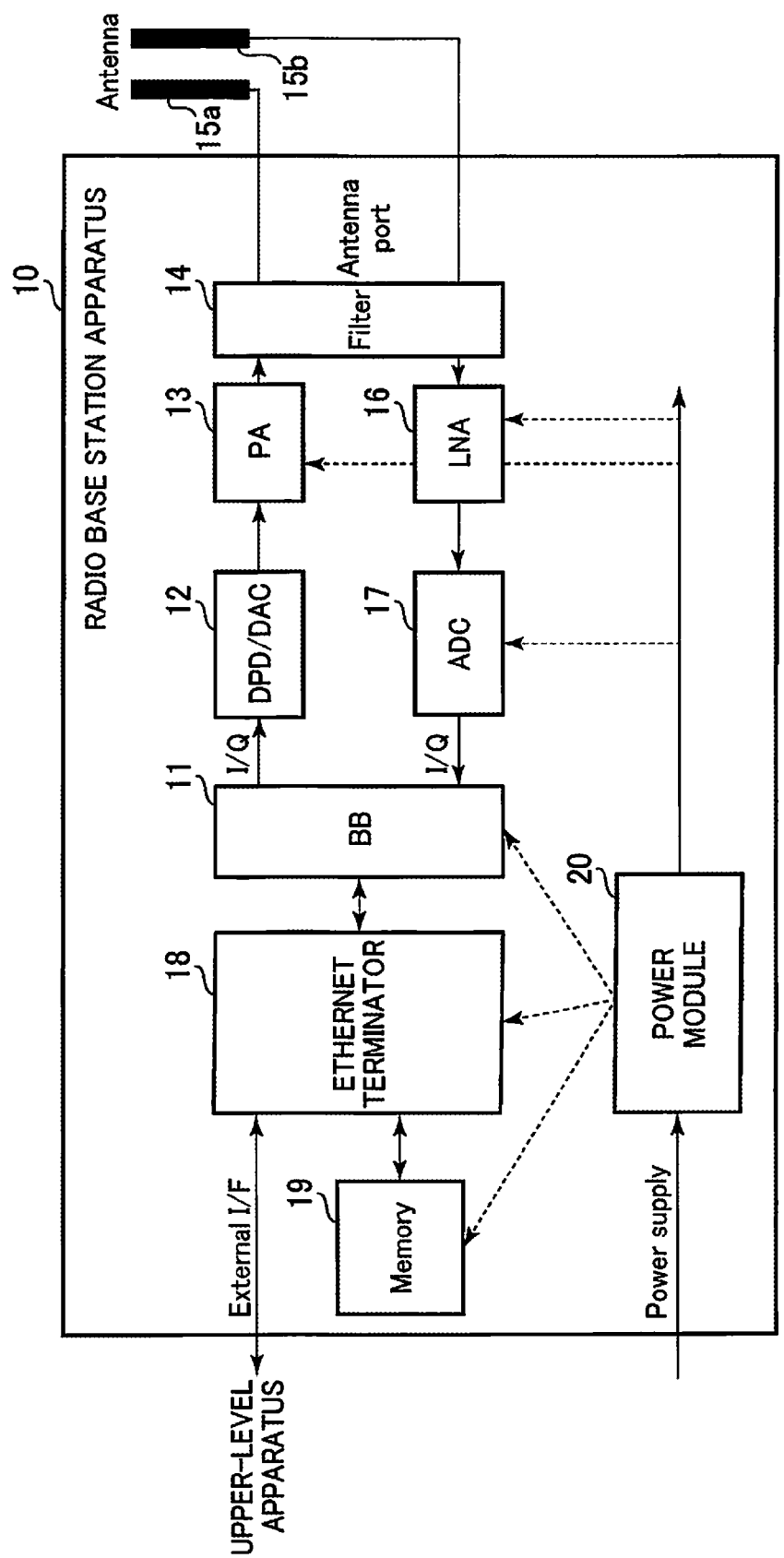
FIG. 4 illustrates a configuration example of a base station.
Figure 5:
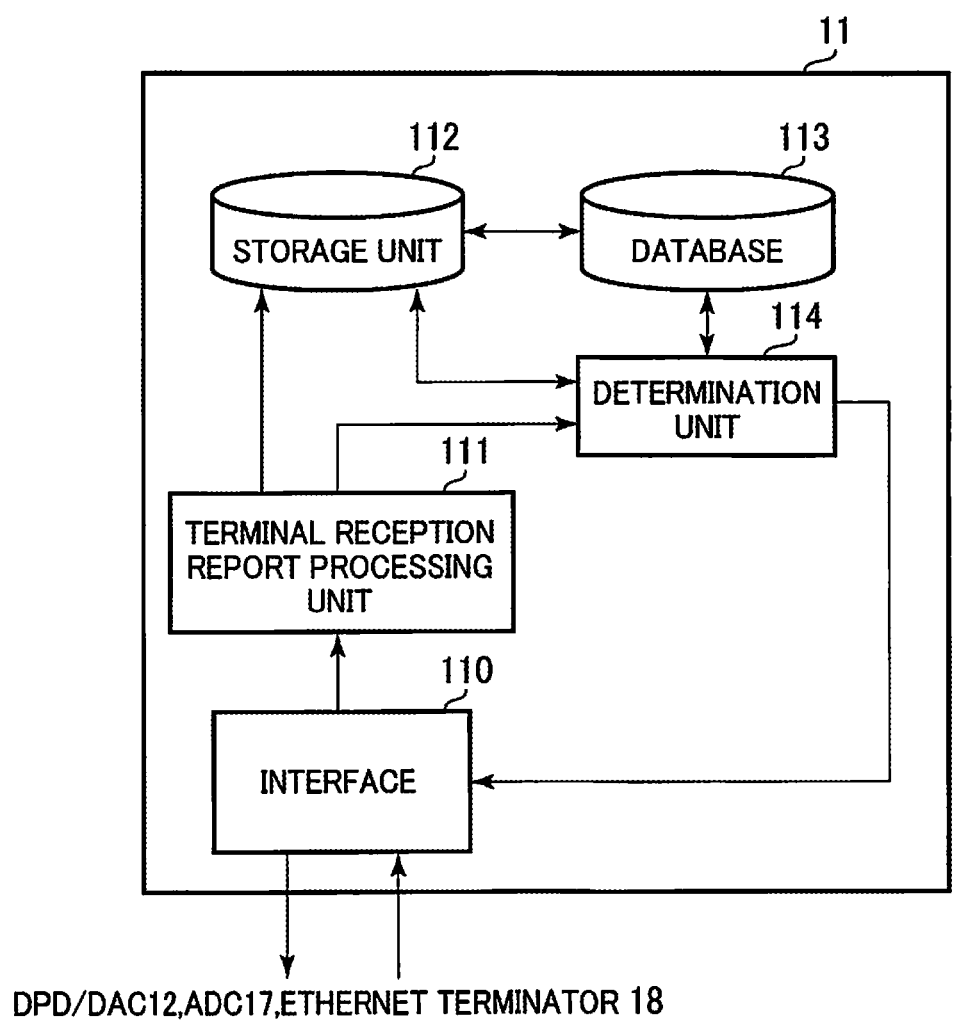
FIG. 5 illustrates a configuration example of a BB unit.

Next, a description will be given on configuration examples of the base station 10 and the terminal 30. FIG. 4 illustrates a configuration example of the base station 10, and FIG. 5 illustrates a configuration example of the terminal 30. The base station 10 corresponds to each base station 10-1 to 10-7 depicted in FIG. 2, or corresponds to each base station 10-10 to 10-15 depicted in FIG. 3.

The base station 10 includes a BB (Base Band) unit 11, a DPD/DAC (Digital Pre-Distortion/Digital to Analogue Converter) 12, a PA (Power Amplifier) 13, a filter 14 and antennas 15a, 15b. The base station 10 also includes a LNA (Low Noise Amplifier) 16, an ADC (Analogue to Digital Converter) 17, an Ethernet terminator 18, a memory 10 and a power module 20.

The BB unit 11 performs error correction coding processing and modulation processing on data received from the Ethernet terminator 18 to convert into an output signal. The BB unit 11 further converts the output signal of a serial format into an output signal of a parallel format, to convert the output signal into two series of an in-phase component signal (I-signal) and a quadrature component signal (Q-signal). The BB unit 11 outputs the output signal converted into the two series to the DPD/DAC 12.

Also, the BB unit 11 converts the input signal received from the ADC 17 into a serial format, and also performs demodulation processing, error correction decoding processing, etc., so as to extract data. The BB unit 11 outputs the extracted data to the Ethernet terminator 18.

To enable such error correction coding processing, modulation processing and conversion processing into a parallel format, the BB unit 11 may also be configured to provide an error correction coding circuit, a modulation circuit, a serial/parallel converter circuit, etc.

Further, the BB unit 11 stores information of a handover condition into an internal table according to a handover strategy, for example. Then, based on report information transmitted from the terminal 30, the BB unit 11 decides a handover destination cell that satisfies the handover condition. The details will be described later. On determining the handover destination cell, the BB unit 11 generates a series of messages related to the handover to exchange with the terminal 30 and a base station that accommodates the handover destination cell.

The DPD/DAC 12 receives the output signal including two series of I and Q signals from the BB unit 11, and performs distortion compensation processing (or digital pre-distortion processing) on the output signal to compensate distortion in an input/output characteristic of the PA 13. Also, the DPD/DAC 12 converts the distortion-compensated output signal of a digital format into an output signal of an analogue format. The DPD/DAC 12 outputs to the PA 13 the output signal converted into the analogue format.

The PA 13 amplifies the output signal output from the DPD/DAC 12 to output to the filter 14.

The filter 14 filters a certain frequency component in the output signal output from the PA 13, for example, to convert (upconvert) the output signal into a radio signal of a radio band. The filter 14 outputs the radio signal to the antenna 15a.

Further, the filter 14 receives a radio signal output from the antenna 15b, and filters a certain frequency component to convert (downconvert) the radio signal of a radio band into an input signal of a base band. The filter 14 functions as a frequency converter circuit, for example. The filter 14 then outputs the converted input signal to the LNA 16.

The antenna 15a is, for example, a transmission antenna that transmits the radio signal output from the filter 14 to the terminal 30. Also, the antenna 15b is, for example, a reception antenna that receives the radio signal transmitted from the terminal 30 and outputs the received signal to the filter 14.

The LNA 16 is, for example, a low-noise amplifier that amplifies the input signal output from the filter 14 to enable amplifying a faint input signal transmitted from the terminal 30.

The ADC 17 converts the input signal of an analogue format output from the LNA 16 into a digital format. The ADC 17 outputs to the BB unit 11 the input signal converted into the digital format.

The Ethernet terminator 18 receives and terminates packet data transmitted from an upper-level apparatus, for example, to extract data etc. from a packet data payload area. The packet data is of a TCP (Transmission Control Packet) format, for example. The Ethernet terminator 18 outputs the extracted data to the BB unit 11.

Also, the Ethernet terminator 18 converts data output from the BB unit 11 into data of a packet format, to transmit to the upper-level apparatus. The Ethernet terminator 18 appropriately accesses the memory 19 to process the packet data.

The memory 19 stores the data etc. output from the Ethernet terminator 18. The stored data etc. are appropriately read out by the Ethernet terminator 18.

The power module 20 is a power unit that supplies electricity to the internal of the base station 10, for example, to supply electricity supplied from the external to the memory 19, the ADC 17, the PA 13, the LNA 16, etc.

<Configuration Example of BB Unit 11>

Next, a description will be given on a configuration example of the BB unit 11. FIG. 5 illustrates the configuration example of the BB unit 11. The BB unit 11 depicted in FIG. 5 illustrates a part that performs processing to decide a handover destination cell, for example.

The BB unit 11 includes an interface 110, a terminal reception report processing unit 111, a storage unit 112, a database 113 and a determination unit 114.

Incidentally, the determination unit 120 in the first embodiment corresponds to the determination unit 114, for example. Also, the transmission unit 121 in the first embodiment corresponds to the interface 110, the DPD/DAC 12, the PA 13, the filter 14 and the transmission antenna 15a, for example.

The interface 110 outputs data etc. processed in the BB unit 11 to other blocks (the DPD/DAC 12, the ADC 17 and the Ethernet terminator 18), and also fetches data output from the other blocks into the BB unit 11, to output to the terminal reception report processing unit 111.

In the present second embodiment, for example, the interface 110 extracts a report message among data output from the ADC 17, to output to the terminal reception report processing unit 111. The report message, which is transmitted from the terminal 30, includes report information measured in the terminal 30. Details of the report information will be described later.

Also, the interface 110 receives handover destination information etc. output from the determination unit 114, to execute processing related to handover. For example, the interface 110 generates a message related to handover, to exchange messages with the terminal 30 and the base station of a handover destination, and also terminates messages transmitted from the terminal 30 and the base station of the handover destination. Here, the processing related to the handover may be performed in another processing block (including a block not illustrated in FIG. 5) in the BB unit 11.

The terminal reception report processing unit 111 receives the report message output from the interface 110, to extract report information. The report information includes:

(1) the cell ID of a cell in which the terminal 30 is located, and a receiving signal level at the terminal 30 in regard to a signal transmitted from a base station 10 that accommodates the cell in which the terminal 30 is located, (2) the cell ID of a cell that neighbors a cell in which the terminal 30 is located, and a receiving signal level at the terminal 30 in regard to a signal transmitted from a base station (including the base station 10 currently in connection) that accommodates the neighboring cell, (3) battery residual quantity information of the terminal 30 (or power residual quantity information), (4) a requested throughput requested from the terminal 30, etc., for example.

Such report information is transmitted within the report message generated in the terminal 30, for example.

The receiving signal level is represented by RSSI (Received Signal Strength Indicator), RSRP (Reference Signal Receive Power), Pilot Ec/Io (the ratio of pilot signal power to total power), etc. The battery residual quantity information represents battery residual quantity in the terminal 30, like 95% left, 60% left, 20% left, etc., for example. Also, the requested throughput of the terminal 30 is information that represents a throughput with which the terminal 30 requests the base station 10 to transmit data, such as 1 Mbps or more, 5 Mbps or more, etc., for example.

The terminal reception report processing unit 111 outputs a part or all of the extracted report information to the storage unit 112, and also outputs a receiving signal level of each handover destination candidate cell included in the report information to the determination unit 114.

The storage unit 112 is a memory etc., for example, in which the report information is stored. The storage unit 112 stores a table in which information related to each handover destination candidate cell prioritized by the determination unit 114 is stored. Details of the table will be described later. The stored report information etc. is appropriately read out by the determination unit 114 and the database 113.

The database 113 is a memory etc., for example, in which a table that stores information of a handover condition etc. is stored. Details of the table will also be described later. Incidentally, in the table stored in the database 113, the information of the handover condition etc. is appropriately changed through inputting from an operator, downloading from an upper-level apparatus, etc., for example.

The determination unit 114 temporarily prioritizes handover destination candidate cells, and stores the result thereof into the storage unit 112 as table. For example, the determination unit 114 prioritizes each receiving signal level of the handover destination candidate cells received from the terminal reception report processing unit 111, in order from the highest receiving signal level to the lowest.

Also, the determination unit 114 reads out the information related to each handover destination candidate cell, which is temporarily prioritized and stored in the storage unit 112, to collate with the table stored in the database 113 to select a handover destination. The determination unit 114 decides a handover destination on the basis of whether or not the handover destination candidate cell satisfies the handover condition. The determination unit 114 outputs information of the decided handover destination to the interface 110, so that the information is transmitted from the interface 110 to the terminal 30. The terminal 30 then executes handover according to the decided handover information. Detailed processing in the determination unit 114 will be described later.

<Configuration Example of Terminal 30>

Figure 6:
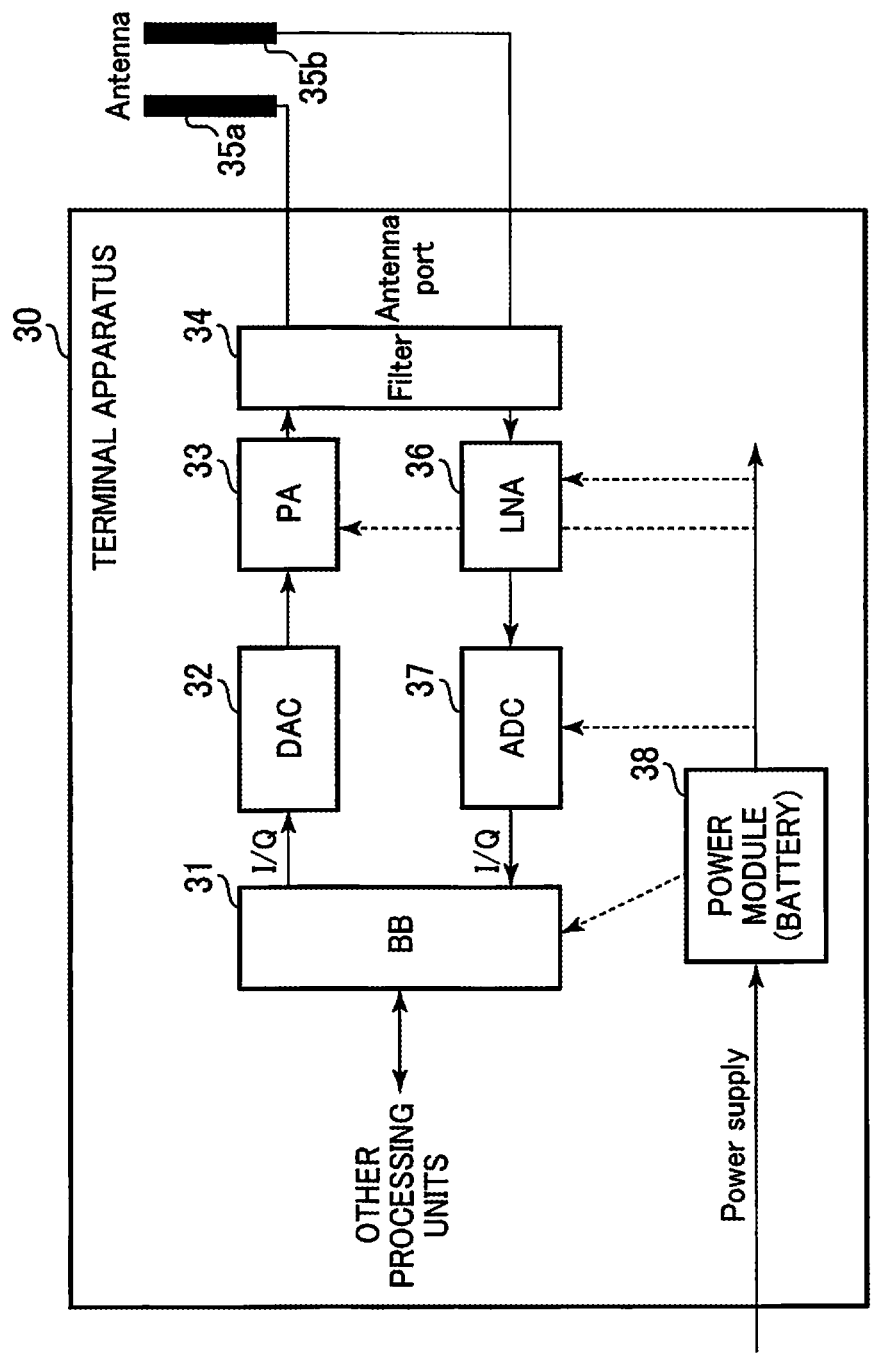
FIG. 6 illustrates a configuration example of a terminal.

FIG. 6 illustrates a configuration example of the terminal 30. The terminal 30 includes a BB unit 31, a DAC 32, a PA 33, a filter 34, antennas 35a, 35b, an LNA 36, an ADC 37 and a power module 38.

Incidentally, the reception unit 310 in the first embodiment corresponds to the antennas 35a, 35b, the filter 34, the LNA 36, the ADC 37 and the BB unit 31, for example.

The BB unit 31 performs parallel/serial conversion, demodulation processing, error correction decoding processing, etc. on an input signal (including the components of an I-signal and a Q-signal, for example) output from the ADC 37, so as to extract data etc. transmitted from the base station 10. The BB unit 31 outputs the extracted data etc. to other processing units of a microphone and a monitor screen, to enable voice output and image display.

The BB unit 31 also receives data etc. output from the other processing units such as an operation unit, and performs error correction coding processing, modulation processing, serial/parallel conversion, etc., to output to the DPD/DAC 32 as an output signal.

In the present second embodiment, the BB unit 31 can measure receiving signal levels of a cell in which the terminal 30 is located and a handover destination candidate cell. For example, by measuring the receiving signal level of each pilot signal transmitted from the base station 10, the terminal 30 measures the receiving signal level of each cell.

In the example depicted in FIG. 3, the terminal 30, when located in a cell whose cell ID is "5", receives each pilot signal transmitted from a transmission antenna 15a corresponding to the cell in a connected base station 10-11. The terminal 30 also receives cell ID information (cell ID="5") together with the pilot signal. By measuring the receiving signal level of the pilot signal, the terminal 30 can measure the receiving signal level of the self-cell (cell ID="5").

Also, the terminal 30 receives a pilot signal and a cell ID (cell ID="4") transmitted from a transmission antenna 15a that corresponds to the cell ID="4" in the connected base station 10-11. By measuring the receiving signal level of the pilot signal, the terminal 30 can measure the receiving signal level of the cell whose cell ID is "4".

Additionally, the terminal 30, when located in each cell, receives each cell ID of neighboring cells as notification information. By this, the terminal 30 can acquire each cell ID of the neighboring cells other than the cell in which the terminal 30 is located.

With reference back to FIG. 6, the BB unit 31 can also acquire battery residual quantity information of the terminal 30. For example, the BB unit 31 measures battery residual quantity by measuring a voltage of the power module 38. The BB unit 31 may measure the battery residual quantity, with parameters like temperature and the number of charge cycles taken into account also.

Also, the BB unit 31, by the reception of data output from another processing unit, may decide a requested throughput on the basis of a data volume of the data, for example.

The BB unit 31 generates report information that includes the receiving signal level, the battery residual quantity and the requested throughput, and further generates a report message including the report information, to transmit through the DPD/DAC 32 etc. to the base station 10.

The DPD/DAC 32 performs distortion compensation processing on an output signal output from the BB unit 31, and converts the distortion-compensated output signal into an analogue signal.

The PA 33 amplifies the output signal output from the DPD/DAC 32.

The filter 34 filters a component of a predetermined frequency band of the output signal output from the PA 33, to convert (up convert) into a radio signal. The radio signal is transmitted from the antenna 35 to the base station 10.

The filter 34 also receives a radio signal received by the antenna 35, and filters a component of a predetermined frequency band on the radio signal, to convert (down convert) into an input signal of a base band.

The LNA 36 is, for example, a low-noise amplifier to amplify the input signal output from the filter 34.

The ADC 37 converts an input signal output from the LNA 36 into a digital signal, to output to the BB unit 31. The BB unit 31 receives from the ADC 37 the input signal converted into the digital signal, to receive data and a message related to handover, which are transmitted from the base station 10, information of the handover destination decided by the base station 10, or the like. According to the handover destination information, the BB unit 31 executes handover to the handover destination.

<Table Example>

Next, a description will be given on an example of tables stored in the storage unit 112 and the database 113.

FIG. 7A illustrates an example of a table 1120 stored in the storage unit 112. The table 1120 stores information related to each handover destination candidate cell that is temporarily prioritized by the determination unit 114, for example.

In the example depicted in FIG. 7A, each rank ("1", "2", ...) is given in order from the highest receiving signal level to the lowest. A handover destination candidate cell ranked at the highest priority is a cell whose cell ID is "5", and a handover destination candidate cell ranked next to the highest priority is a cell whose cell ID is "3", and so on.

FIG. 7B illustrates an example of a table 1130 stored in the database 113. The table 1130 is provided to map each cell ID with a cell characteristic, for example. In the example depicted in FIG. 7B, a cell whose cell ID is "1" is indicated as "outdoor/Macro", which signifies to have the cell characteristic of an outdoor macro cell.

The table 1130 further includes an item "Codes". The "Codes" indicates each identifier that represents the combination of a cell ID with a cell characteristic, for example. In the example depicted in FIG. 7B, a cell having a code "A" is a cell whose cell ID is "1" and cell characteristic is "outdoor/Macro".

In FIG. 7B, "Femto (Public)" represents a femto cell (or a femto base station) available by any user, for example. Also, "Femto (CSG)" is a femto cell to which access is restricted to a specific user and a group, for example.

FIG. 8A illustrates an example of a table 1131 stored in the database 113. The table 1131 is provided to map a cell characteristic with a code, for example. The table 1131 corresponds to the relationship of the "Cell characteristics" with the "Codes" in the table 1130 depicted in FIG. 7B.

FIG. 8B illustrates an example of a table 1132 stored in the database 113. The table 1132 defines the relationship of a handover pattern with a handover condition. The table 1132 includes items of "HO patterns" and "Algorithms".

The "HO patterns" includes the relationship of cell characteristics and handover directions. For example, in the "HO patterns", "A→B" represents a handover from a cell having a code A to a cell having a code B. By the table 1130, the code "A" represents an outdoor macro cell whose cell ID is "1". Also, by the table 1130, the code "B" represents an outdoor micro cell whose cell ID is "5". Accordingly, "A→B" represents a handover from the macro cell whose cell ID is "1" to the micro cell whose cell ID is "5".

Further, the "Algorithms" in the table 1132 stores each handover condition (or movement condition), for example. In the example depicted in FIG. 8B, a handover condition when a handover is performed according to "A→B" of the "HO patterns" is stored in "(1)" of the "Algorithms".

The "Algorithms" is configured in such a manner that when a handover condition is changed, the handover condition stored in the "Algorithms" is changed accordingly, for example. Therefore, by changing the handover condition stored in the "Algorithms" of the table 1132, the operator can change and execute a handover strategy. With this, the operator enables the radio communication system 100 to execute handover according to an operational policy, for example, so as to take flexible measures along the intention of the operator.

<Operation Example>

Next, an operation example according to the present second embodiment will be described. The present operation example illustrates an exemplary case of controlling a handover occurrence rate. As an operational policy, controlling the handover occurrence rate etc. is given, for example. To achieve such an operational policy, it is assumed that a handover strategy as described below is adopted. That is, a handover strategy of "placing the terminal 30 in a cell as large in size as possible".

By the achievement of such a handover strategy in the radio communication system 100, the above-mentioned operational policy can be achieved. In the present operation example, a description will be given on how such a handover strategy is achieved.

Figure 9:
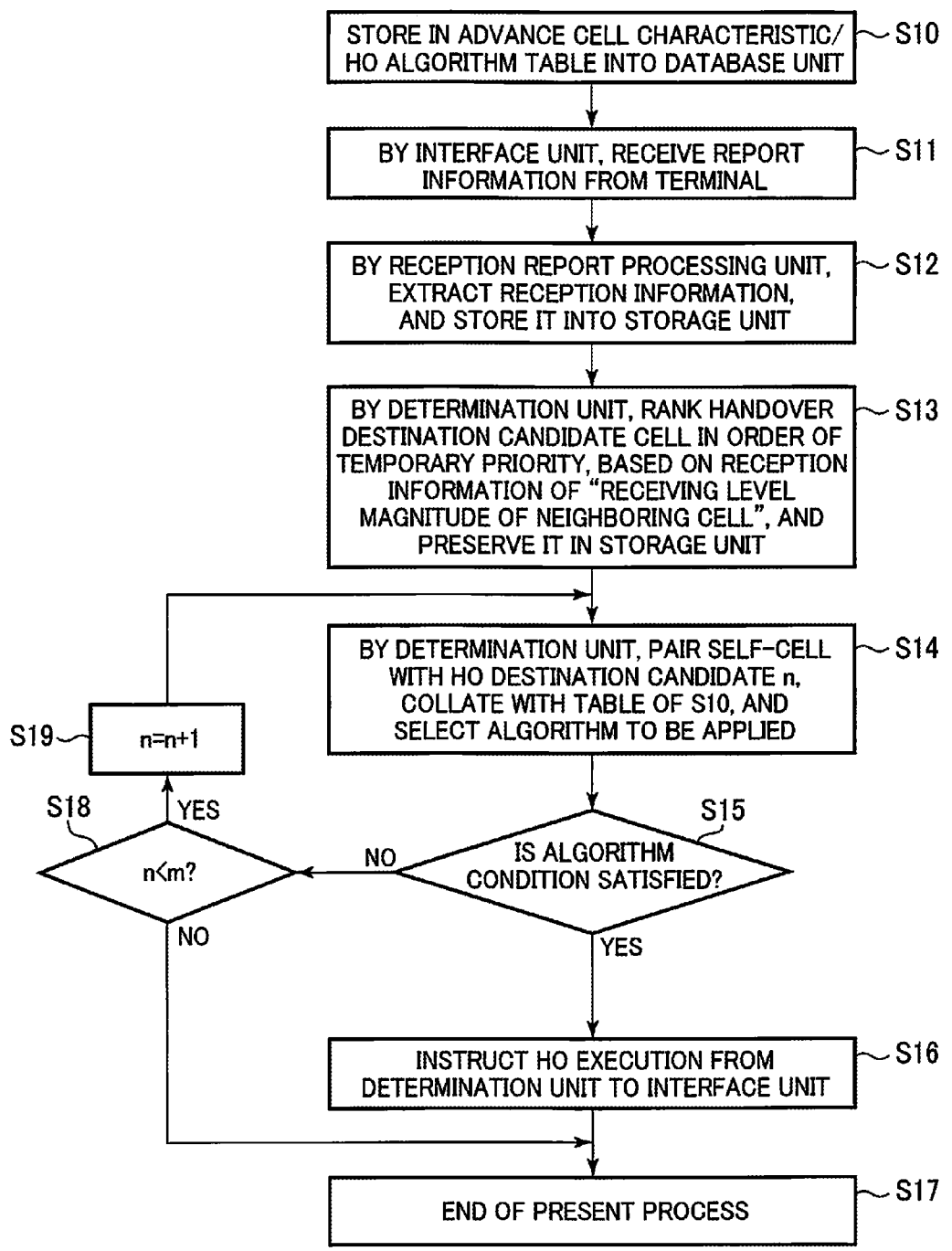
FIG. 9 is a flowchart illustrating an operation example of handover destination decision processing.

FIG. 9 is a flowchart illustrating an operation example in the present second embodiment.

The base station 10 stores the table 1132 in the database 113 (S10). For example, by the operation of the base station 10 from the operator, the table 1132 is stored in the database 113. In this case, a handover condition in accordance with the handover strategy of "placing the terminal 30 in a cell as large in size as possible" is stored in the table 1132.

As a method for actualizing such a handover strategy, the following conditions are set, for example.

(5) A handover condition from a macro cell to a micro cell, from a micro cell to a pico cell, from a pico cell to a femto cell (in short, a handover condition from a large cell to a small cell) is set to be: the receiving signal level of a handover destination candidate cell>the receiving signal level of a handover source cell (or the self-cell), and the receiving signal level of the destination candidate cell≥−80 dBm, and (6) A handover condition from a femto cell to a pico cell, from a pico cell to a micro cell, from a micro cell to a macro cell (in short, a handover condition from a small cell to a large cell) is set to be: the receiving signal level of a handover destination candidate cell>the receiving signal level of the self-cell, and the receiving signal level of the destination candidate cell≥−85 dBm. Here, if cell sizes are equivalent between before and after the handover, the above (5) is adopted.

Here, in regard to the handover condition, if a normal condition is set to be "the receiving signal level of a handover destination candidate cell>the receiving signal level of the self-cell, and the receiving signal level of the destination candidate cell≥−85 dBm", for example, the handover condition in the above (6) is a normal condition. Also, the handover condition in the above (7) is a more difficult (severer) condition for the handover of the terminal 30 than the normal condition. The above "−85 dBm" is one example and another numerical value may be applicable.

For example, in the example of the table 1132, as "(1)" in the "Algorithms", "the receiving signal level of a handover destination candidate cell>the receiving signal level of the self-cell, and the receiving signal level of the destination candidate cell≥−80 dBm" is stored. Also, as "(2)" in the "Algorithms", "the receiving signal level of a handover destination candidate cell>the receiving signal level of the self-cell, and the receiving signal level of the destination candidate cell≥−85 dBm" is stored.

Figure 10A:
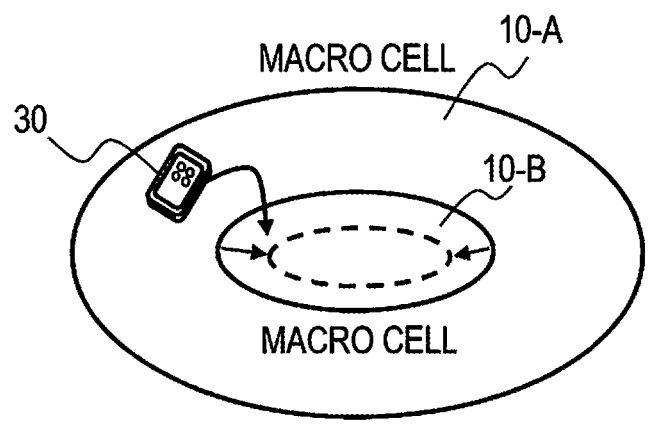
FIG. 10A and FIG. 10B illustrate examples of a cell configuration.

FIG. 10A illustrates exemplary cell sizes of the macro cell 10-A and the micro cell 10-B. Since a handover condition from a large cell to a small cell is severer than the normal condition, the cell range of the micro cell 10-B is changed from a range as depicted with the solid line to a range as depicted with the dotted line. By this, for example, the handover of the terminal 30 from a large cell like the macro cell 10-A to a small cell like the micro cell 10-B is restricted. As a result, the number of terminals 30 placed in the macro cell 10-A becomes larger, as compared to the normal condition. Thus, by the above-mentioned handover conditions (5) and (6), the handover strategy of "placing the terminal 30 in a cell as large in size as possible" can be actualized.

As such, by the storage of an "algorithm" in the table 1132, a handover condition according to an operational condition is set, for example. That is, a handover condition according to the handover strategy of "placing the terminal 30 in a cell as large in size as possible" is set. Thereafter, if there is a handover destination candidate that satisfies the set handover condition, the base station 10 decides the handover destination candidate to be a handover destination.

Hereinafter, the term "algorithm" may also be referred to as "handover condition", and vice versa.

With reference back to FIG. 9, next, the interface 110 receives report information transmitted from the terminal 30 (S11). For example, the interface 110 receives from the ADC 17 a report message transmitted from the terminal 30.

Next, the terminal reception report processing unit 111 receives the report message from the interface 110 and extracts the report information to output to the storage unit 112 (S12). For example, the terminal reception report processing unit 111 stores the receiving signal level of the self-cell into the storage unit 112, and outputs each receiving signal level of the handover destination candidate cells to the determination unit 114.

Next, based on each receiving signal level of the handover destination candidate cells, the determination unit 114 temporarily prioritizes the handover destination candidate cells (S13). There is performed the temporary prioritization in order from the highest receiving signal level to the lowest. The determination unit 114 stores information related to the temporary priority order, and thus, the table 1120 is stored into the storage unit 112, as depicted in FIG. 7B for example.

With reference back to FIG. 9, next, the determination unit 114 selects a handover destination candidate cell having an n-th priority order in the temporary priority order. The determination unit 114 then pairs the self-cell with the selected cell, to collate with the table 1130 to select an algorithm to be applied (S14).

For example, when temporary prioritization as depicted in FIG. 7A is made, the determination unit 114 first reads out a cell ID="5" having the first (n=1) priority (or the highest priority) from the table 1120 stored in the storage unit 112. The determination unit 114 then reads out a code "B" that corresponds to the cell ID="5" from the table 1130 stored in the database 113. Here, it is assumed that the self-cell has a cell ID="1" (code="A") and the receiving signal level of the self-cell is "−87 dBm". The determination unit 114 pairs the self-cell with the handover destination candidate cell ("A", "B") and selects an algorithm "(1)" that corresponds to the pair ("A→B" in "HO patterns") from the table 1132. As the algorithm "(1)", for example, "the receiving signal level of a handover destination candidate cell>the receiving signal level of the self-cell, and the receiving signal level of the destination candidate cell≥−80 dBm" is stored.

Next, the determination unit 114 determines whether or not the algorithm condition is satisfied (S15). For example, the determination unit 114 determines whether or not a receiving signal level "−81 dBm" of the handover destination candidate cell and a receiving signal level "−87 dBm" of the self-cell satisfy the condition of "the receiving signal level of a handover destination candidate cell>the receiving signal level of the self-cell, and the receiving signal level of the destination candidate cell≥−80 dBm". In this example, the receiving signal level of the handover destination candidate cell is "−81 dBm", and therefore, the handover condition of "the receiving signal level of the destination candidate cell≥−80 dBm" is not satisfied. Accordingly, the determination unit 114 determines that the algorithm condition is not satisfied (No in S15).

For example, if the handover condition is the normal condition (that is, "the receiving signal level of the handover destination candidate cell>the receiving signal level of the self-cell, and the receiving signal level of the destination candidate cell≥−85 dBm"), the handover condition is satisfied. Accordingly, the determination unit 114 decides the cell whose cell ID is "5" to be a handover destination.

The determination unit 114, on determining that the handover condition is not satisfied (No in S15), determines whether or not "n" exceeds the total number "m" of handover destination candidates that are temporarily prioritized (S18). For example, the determination unit 114 determines whether or not processing up to S15 has been completed for all handover destination candidate cells stored in the table 1120.

If n of the n-th priority order is smaller than the total number m (Yes in S18), the determination unit 114 increments the priority order by one (n=n+1) (S19), and next, sets a prioritized handover destination candidate cell to be a target for selection to perform processing of S14 and S15.

For example, after selecting the first (n=1) handover destination candidate cell in the table 1120, the determination unit 114 selects the second (n=2) handover destination candidate cell (whose cell ID is "3") to perform the processing S14, S15.

If the algorithm condition is not satisfied for all prioritized handover destination candidate cells that are targeted (No in S15 and No in S18), the determination unit 114 terminates the present processing without determining a handover destination (S17). In this case, the base station 10 does not permit handover, and the terminal 30 is not handed over accordingly.

On the other hand, if the receiving level satisfies the handover condition (Yes in S15), the determination unit 114 decides the paired handover destination candidate cell to be a handover destination cell, to instruct the interface 110 to execute handover (S16).

On determining the handover destination, the determination unit 114 completes the present processing (S17).

As such, according to the present second embodiment, the handover condition stored in the table 1132 can be changed in the base station 10, according to each cell size. Therefore, the operator that operates the base station 10 can take flexible measures as compared to the case of a uniform handover condition, and also can set a handover condition according to the cell size. Since no capital investment such as the additional installation of an apparatus is made at the change of such a handover condition, it is possible to avoid cost increase in the present radio communication system 100.

Further, according to the present second embodiment, each cell size (dimension or range) is added to the handover determination condition. By the addition of the cell size to the handover determination condition, it is possible to prevent the occurrence of handover that may occur under the normal handover condition. By this, it is possible to suppress a handover occurrence rate in HetNet, for example.

Moreover, it is possible to perform operation in accordance with an operational policy of the operator including the control of the handover occurrence rate. In this case also, the operator does not perform additional capital investment or investment for enhancing base station processing capacity to actualize such an operational policy. Therefore, cost increase can also be avoided.

Further, by the suppression of the handover occurrence rate, messages to be exchanged between the base station 10 and the terminal 30 in regard to handover can be suppressed, enabling increase of data exchange according to the suppressed message exchange, and an improved throughput.

The above-mentioned example describes the handover strategy of "placing the terminal 30 in a cell as large in size as possible". However, it is also possible to adopt a strategy of "placing the terminal 30 in a cell as small in size as possible". In this case, in regard to an "algorithm" to move from a small cell to a large cell, a handover condition severer than others (for example, "the receiving signal level≥−80 dBm") may be applied, whereas in regard to an "algorithm" to move from a large cell to a small cell, a handover condition equivalent to the normal handover condition (for example, "the receiving signal level≥−85 dBm") may be applied. In this case also, the operational policy of the operator such as controlling the handover occurrence rate can be actualized, as in the example described earlier.

Third Embodiment

Next, a third embodiment will be described. The third embodiment is an example of achieving an operational policy to enable an effective use of network resources, for example. As a handover strategy to actualize the above operational policy, the following is adopted:

"Placing the terminal 30 in a micro cell, a pico cell or a femto cell when a larger frequency band is available in the micro cell, the pico cell or the femto cell than in the macro cell."

For example, an effective use of total resources in the radio communication system 100 can be achieved if the base station 10 controls handover in a manner to place the terminal 30 in the micro cell, the pico cell or the femto cell in which a larger frequency band is used than in the macro cell.

As a method for actualizing such a handover strategy, the following are adopted, for example:

(7) In regard to handover from a femto cell to a pico cell, from a pico cell to a micro cell and from a micro cell to a macro cell (or handover from a small cell to a large cell), the normal handover condition is applied.

(8) In regard to handover from a macro cell to a micro cell, from a micro cell to a pico cell, from a pico cell to a femto cell (or handover from a large cell to a small cell), a handover condition is set to be: "the receiving signal level of the handover destination candidate cell>the receiving signal level of the handover source cell (or self-cell), and the receiving signal level of the destination candidate cell≥−90 dBm". Here, if cell sizes are equivalent between before and after the handover, the above (7) is adopted.

Figure 10B:
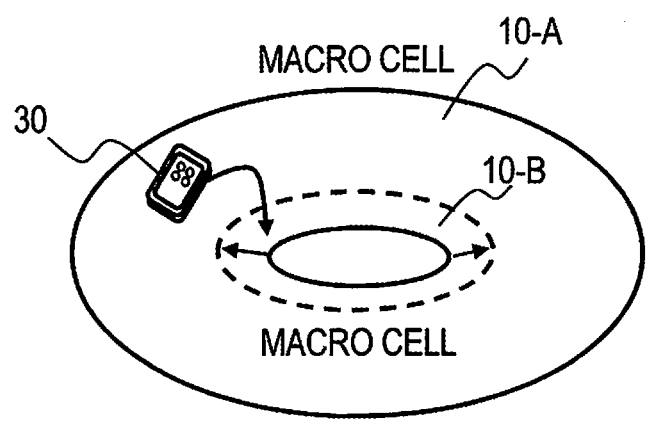

FIG. 10B illustrates exemplary cell sizes of the macro cell 10-A and the micro cell 10-B. The above-mentioned handover condition from a large cell to a small cell enables easy-to-handover as compared to the normal condition (that is, a receiving signal level RSSI≥−85 dBm, for example). Therefore, a cell range of the micro cell 10-B is expanded from the solid line to the dotted line, so that the number of terminals 30 to be handed over to the micro cell 10-B increases as compared to the case of the normal condition. By this, the terminal 30 can be placed in the small cell, for example.

An operation example according to the present third embodiment is illustrated by a flowchart depicted in FIG. 9, similar to the second embodiment.

As depicted in FIG. 9, the base station 10 stores handover conditions corresponding to the above (7) and (8) into the "Algorithms" in the table 1132 (S10).

In the example of the table 1132 depicted in FIG. 8B, for example, in "(1)" in the "Algorithms", a handover condition of "the receiving signal level of a handover destination candidate cell>the receiving signal level of the self-cell, and the receiving signal level of the destination candidate cell≥−90 dBm" is stored.

Also, in "(2)" in the "Algorithms", a handover condition of "the receiving signal level of a handover destination candidate cell>the receiving signal level of the self-cell, and the receiving signal level of the destination candidate cell≥−85 dBm" is stored.

With reference back to FIG. 9, the interface 110 receives report information transmitted from the terminal 30, and the determination unit 114 temporarily prioritizes each receiving level of the handover destination candidate cells, to store into the storage unit 112 (S11-S13).

FIG. 11 illustrates an example of each temporary priority order stored in the table 1120. In the example depicted in FIG. 11, a cell whose cell ID is "5" has the highest receiving level among the handover destination candidate cells, followed by cells whose cell IDs are "3", "2", "1", "4", . . . in that order.

With reference back to FIG. 9, the determination unit 114 pairs the self-cell with the n-th handover destination candidate cell, to collate with the table 1132 to select an algorithm to be applied (S14).

In the example depicted in FIG. 11, the determination unit 114 pairs the self-cell (cell ID="1" and code "A", for example) with the first (n=1) handover destination candidate cell (cell ID="5", code "B") ("A", "B"). The determination unit 114 then selects an algorithm "(1)" that corresponds to the pair ("A→B" in the "HO patterns").

With reference back to FIG. 9, the determination unit 114 determines whether or not the algorithm condition is satisfied (S15).

In the example depicted in FIG. 11, in an algorithm "(1)", "the receiving signal level of a handover destination candidate cell>the receiving signal level of the self-cell, and the receiving signal level of the destination candidate cell≥−90 dBm" is stored. The determination unit 114 determines whether or not the above algorithm condition is satisfied based on the receiving signal level of the handover destination candidate cell of "−86 dBm" and the receiving signal level of the self-cell of "−87 dBm". In this case, the determination unit 114 determines that the algorithm condition is satisfied (Yes in S15). Then, the determination unit 114 decides a cell whose cell ID is "5" to be a handover destination, and instructs the interface 110 to execute handover (S16, S17).

For example, on the assumption that the handover condition from a large cell to a small cell is not "a receiving signal level RSSI≥−90 dBm" but "a receiving signal level RSSI≥−85 dBm", that is, the normal condition, all handover destination candidate cells stored in the table 1120 of FIG. 11 do not satisfy the condition.

Therefore, by setting a handover condition in which a cell size (cell dimension or cell range) is additionally taken into account, it is possible to increase the number of terminals to be handed over from a macro cell to a micro cell, as compared to the case of the normal handover condition, for example.

Thus, as compared to the normal handover condition, the number of terminals 30 placed in a small cell increases, and accordingly, the number of terminals that uses the resource (such as frequency band) of a micro cell, a pico cell or a femto cell increase. As a result, the total resources of the radio communication system 100 (or an overall network) can be used effectively.

This matches an operational policy of aiming at an effective use of network resources, and the operational policy can be reflected in the radio communication system 100. Even in the HetNet structure, the installation of an additional apparatus may not be to actualize such an operational policy, and therefore, cost increase can be avoided also.

Also, in the base station 10, a handover condition stored in the table 1132 can be changed according to a cell size, similar to the second embodiment. Since capital investment such as the installation of an additional apparatus may not be at the change of such a handover condition, a cost increase can be prevented in the present radio communication system 100.

Furthermore, in the above-mentioned handover condition, the handover condition from a large cell to a small cell is easier than the normal condition, whereas the handover condition from a small cell to a large cell is the normal condition. Therefore, a handover occurrence rate from the small cell to the large cell is suppressed as compared to handover from the large cell to the small cell. As such, the handover occurrence rate can also be controlled.

With reference back to FIG. 9, if the algorithm condition is not satisfied, the determination unit 114 selects a handover destination candidate cell having a next priority order (S18, S19) similar to the second embodiment, to process algorithm selection etc. (S14, S15). Thereafter, processing can be executed similar to the second embodiment.

Incidentally, in regard to a handover condition from a small cell to a large cell, it is possible to apply a severer condition such as "a receiving signal level RSSI≥−80 dBm", for example, in place of the normal condition. Even in this case, the number of terminals 30 placed in the small cell can be increased as compared to the normal condition.

Fourth Embodiment

Next, a fourth embodiment will be described. The fourth embodiment is an example to actualize an operational policy of executing handover according to battery residual quantity. As a handover strategy to actualize such an operational policy, the following is adopted:

"If the battery residual quantity in the terminal 30 is quite small, handover is performed when the receiving signal level of the handover destination candidate cell is higher than the receiving signal level of the handover source cell; and if the residual quantity is small, a handover condition easier to hand over as compared to the normal handover condition is applied; and if the residual quantity is large, the normal handover condition is applied."

Incidentally, the above handover strategy is a handover strategy that corresponds to a power saving mode of the terminal 30, for example.

As a method for actualizing the above handover strategy, the following are adopted, for example:

(9) When terminal battery residual quantity is 10% or smaller, handover is executed if the receiving signal level of a handover destination candidate cell>the receiving signal level of a handover source cell (or the self-cell) is satisfied.

(10) When terminal battery residual quantity ranges between 10% and 30%, handover is executed if the receiving signal level of a handover destination candidate cell>the receiving signal level of a handover source cell, and the receiving signal level of the handover destination candidate cell higher than and including "−87 dBm" are satisfied.

(11) When terminal battery residual quantity ranges between 30% and 50%, handover is executed if the receiving signal level of a handover destination candidate cell>the receiving signal level of a handover source cell, and the receiving signal level of the handover destination candidate cell higher than and including "−85 dBm" are satisfied.

(12) When terminal battery residual quantity is 50% or larger, handover is executed if the receiving signal level of a handover destination candidate cell>the receiving signal level of a handover source cell, and the receiving signal level of the handover destination candidate cell higher than and including "−80 dBm" are satisfied.

FIG. 12A illustrates an example of the table 1120 generated by the determination unit 114, and FIG. 12B illustrates a table 1133 related to terminal battery residual quantity. In the table 1133, each handover condition corresponding to the above (9) to (12) is described in the item of "Algorithms". By this, the table 1133 stores each handover condition in which the above each handover strategy is reflected.

Figure 13:
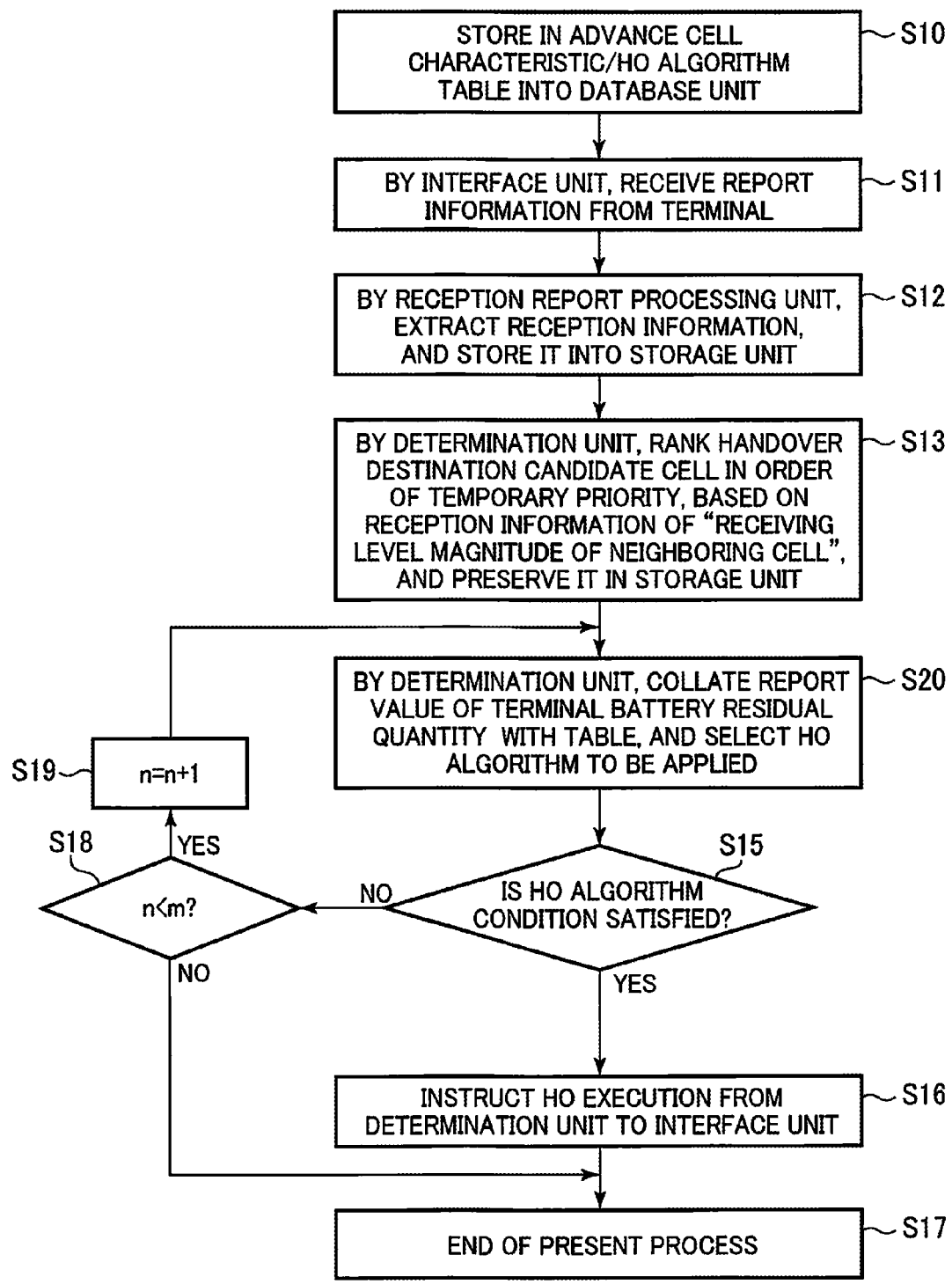
FIG. 13 is a flowchart illustrating an operation example of handover destination decision processing.

FIG. 13 is a flowchart illustrating an operation example of the present fourth embodiment.

The base station 10 stores algorithms corresponding to the above (9) to (12) into the table 1133 (S10).

Next, the terminal reception report processing unit 111 stores the receiving signal level of the self-cell and terminal battery residual quantity information included in report information into the storage unit 112, and outputs each receiving signal level of the handover destination candidate cells to the determination unit 114 (S11, S12).

Next, based on each receiving signal level of the handover destination candidate cells, the determination unit 114 temporarily prioritizes the handover destination candidates (S13).

Next, the determination unit 114 collates with the table 1133 to select an "algorithm" to be applied, based on the battery residual quantity report value of the n-th terminal 30 (S20).

For example, when the battery residual quantity report value is 10%, the determination unit 114 selects "(1)" as an "algorithm". In this "(1)", a handover condition of "the receiving signal level of a handover destination candidate cell>the receiving signal level of a handover source cell (or the self-cell)" is stored.

Next, the determination unit 114 determines whether or not the n-th handover destination candidate cell satisfies the selected "algorithm" (S15).

For example, the determination unit 114 determines whether or not the receiving signal level "−81 dBm" of the first (n=1) handover destination candidate cell satisfies the selected handover condition.

If the receiving signal level of the n-th handover destination candidate cell satisfies the handover condition (Yes in S15), the determination unit 114 decides the n-th handover destination candidate cell to be a handover destination, to instruct to the interface 110 (S16).

For example, the receiving signal level "−81 dBm" of the first (n=1) handover destination candidate cell has a higher numerical value than the receiving signal level "−87 dBm" of the self-cell, the determination unit 114 determines that the handover condition is satisfied.

On the other hand, if the receiving signal level of the n-th handover destination candidate cell does not satisfy the handover condition (No in S15), the determination unit 114 targets a destination candidate cell ranked at the (n+1)th priority order among the temporarily prioritized destination candidate cells (S18, S19), to perform processing of S20 etc.

Thereafter, processing similar to the second embodiment is performed.

As such, in the present fourth embodiment, when the battery residual quantity of the terminal 30 is a threshold or smaller, there is set a handover condition like the above (9) that enables handing over more easily as compared to the normal condition, for example. In such a condition, a handover destination candidate cell having a higher temporary priority order, namely, having a higher receiving signal level is easy to become a handover destination.

Therefore, when the battery residual quantity of the terminal 30 is a threshold or smaller, the terminal 30 is easy to be handed over to a handover destination candidate cell having a higher receiving level. By such handover to a cell having a higher receiving level, the terminal 30 can communicate with a base station 10 that accommodates the cell of interest, with smaller power than the threshold. This enables the battery use of the terminal 30 longer than a threshold time, for example.

Also, by the storage of handover conditions in which the handover strategies described in the above (9) to (12) are reflected into the table 1133, the operation of the radio communication system 100 in which the operational policy of "executing handover according to battery residual quantity" is reflected becomes also possible. Since no additional installation of an apparatus may actualize the above operational policy, cost reduction in the present radio communication system 100 can be attained.

Further, the base station 10 can change a handover condition stored in the table 1133 according to the battery residual quantity of the terminal 30. Therefore, the operator that operates the base station 10 can take flexible measures as compared to the case of a uniform handover condition, and also can set a handover condition according to the battery residual quantity. Since capital investment for the additional installation of an apparatus etc. may not be at the change of the handover condition, cost increase in the present radio communication system 100 can be avoided.

Incidentally, each handover condition described in the above (9) to (12) is one example. Any numerical value or percentage in regard to the battery residual quantity may be applicable if only a handover condition is set to make handover easier than the normal condition as the battery residual quantity of the terminal 30 is smaller.

Fifth Embodiment

Next, a fifth embodiment will be described. In the fourth embodiment, the description has been given on the example that handover is performed based on the battery residual quantity, whereas in the second embodiment, the description has been given on the example that handover is performed based on a cell size. In the present fifth embodiment, an example of performing handover based on both the battery residual quantity and the cell size will be described.

As an operational policy by the operator, it is assumed that there is a policy of "executing handover according to battery residual quantity". In order to actualize this policy, the following handover strategy is adopted:

"To achieve both elongation of a use time when the battery residual quantity of the terminal 30 is small and reduction of handover messages when the battery residual quantity is large."

As a method for actualizing the above handover strategy, the following are adopted, for example.

(13) When terminal battery residual quantity is 10% or smaller, handover is executed if the receiving signal level of a handover destination candidate cell>the receiving signal level of a handover source cell (or the self-cell) is satisfied.

(14) When terminal battery residual quantity ranges between 10% and 30%, handover is executed if the receiving signal level of a handover destination candidate cell>the receiving signal level of a handover source cell, and the receiving signal level of the handover destination candidate cell higher than and including "−87 dBm" are satisfied.

(15) When terminal battery residual quantity ranges between 30% and 50% and handover is intended from a macro cell to a micro cell, from a micro cell to a pico cell, or from a pico cell to a femto cell (namely, from a large cell to a small cell), a handover condition is set severer than the normal condition. As to a handover condition in the reverse direction, the normal condition is applied. Here, if cell sizes are equivalent between before and after the handover, the former condition is adopted.

(16) When terminal battery residual quantity is 50% or larger and handover is intended from a macro cell to a micro cell, from a micro cell to a pico cell, or from a pico cell to a femto cell (namely, from a large cell to a small cell), a handover condition is set severer than the normal condition. As to a handover condition in the reverse direction, the normal condition is applied. Here, if sizes are equivalent between before and after the handover, the former is adopted.

As to a normal condition in the above handover conditions, there is applied "the receiving signal level of a handover destination candidate cell>the receiving signal level of a handover source cell, and the receiving signal level of the handover destination candidate cell>−85 dBm", similar to the description in the second embodiment.

In the above case, a condition in which the handover condition is severer than the normal condition signifies such a handover condition as "the receiving signal level of a handover destination candidate cell>the receiving signal level of a handover source cell, and the receiving signal level of the handover destination candidate cell>−80 dBm", for example.

FIGS. 14A through 15B illustrate examples of the tables 1120, 1130-1131 and 1134 that are applied to the present fifth embodiment.

Figure 14A:
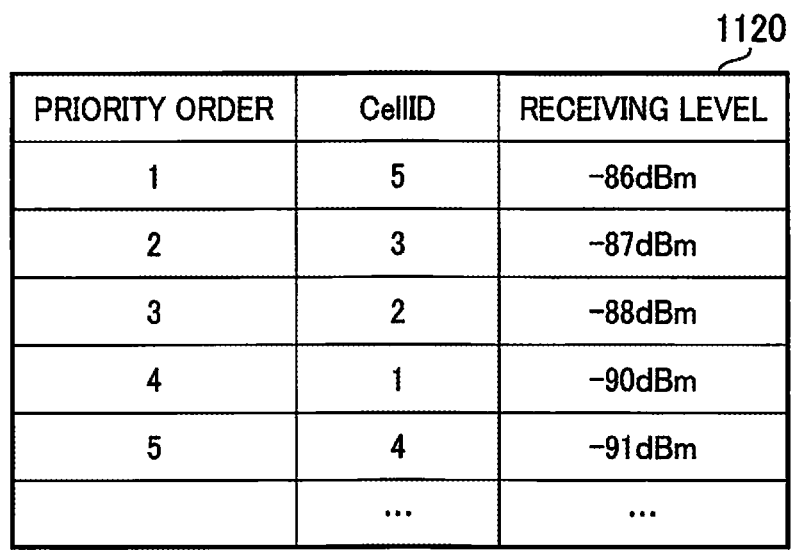
FIG. 14A and FIG. 14B illustrate examples of tables.
Figure 14B:
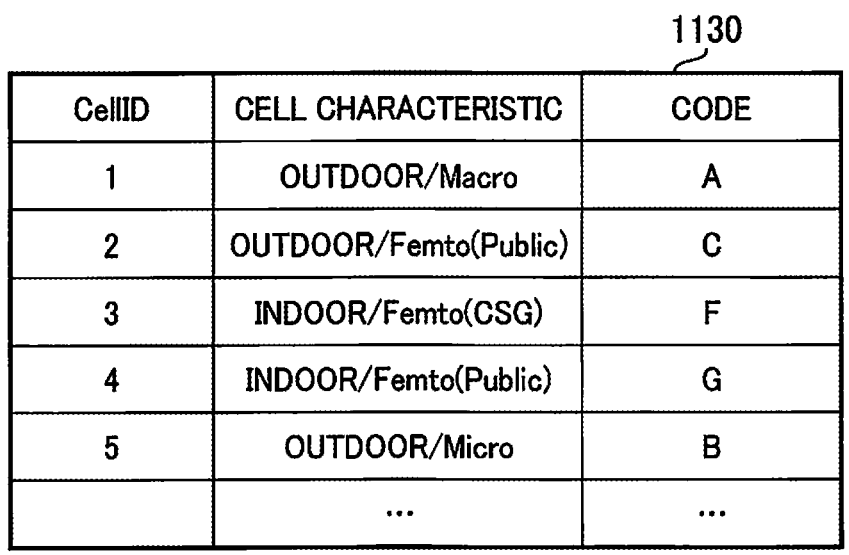

FIG. 14A illustrates a temporarily prioritized table 1120 stored in the storage unit 112, and FIGS. 14B, 15A are examples of the tables 1130, 1131, respectively, similar to the second embodiment.

FIG. 15B is an example of the table 1134 that defines the relationship among battery residual quantity, patterns and handover conditions. The table 1134 depicted in FIG. 15B is an added table in the present fifth embodiment.

As depicted in FIG. 15B, the table 1134 stores an "algorithm" corresponding to the battery residual quantity and the pattern. For example, the above (13) is stored in "(1)" in the "Algorithms", as a handover condition. Similarly, the above (14) is stored in "(2)", and the above (15) is stored in "(3)" in the "Algorithms", respectively, as handover conditions.

As such, in the item of "Algorithms" in the table 1134, handover conditions in which the above-mentioned handover strategies are reflected are stored. By this, it is possible to achieve both the use of the terminal 30 longer than a threshold time and the reduction of handover messages when the battery residual quantity is large.

Figure 16:
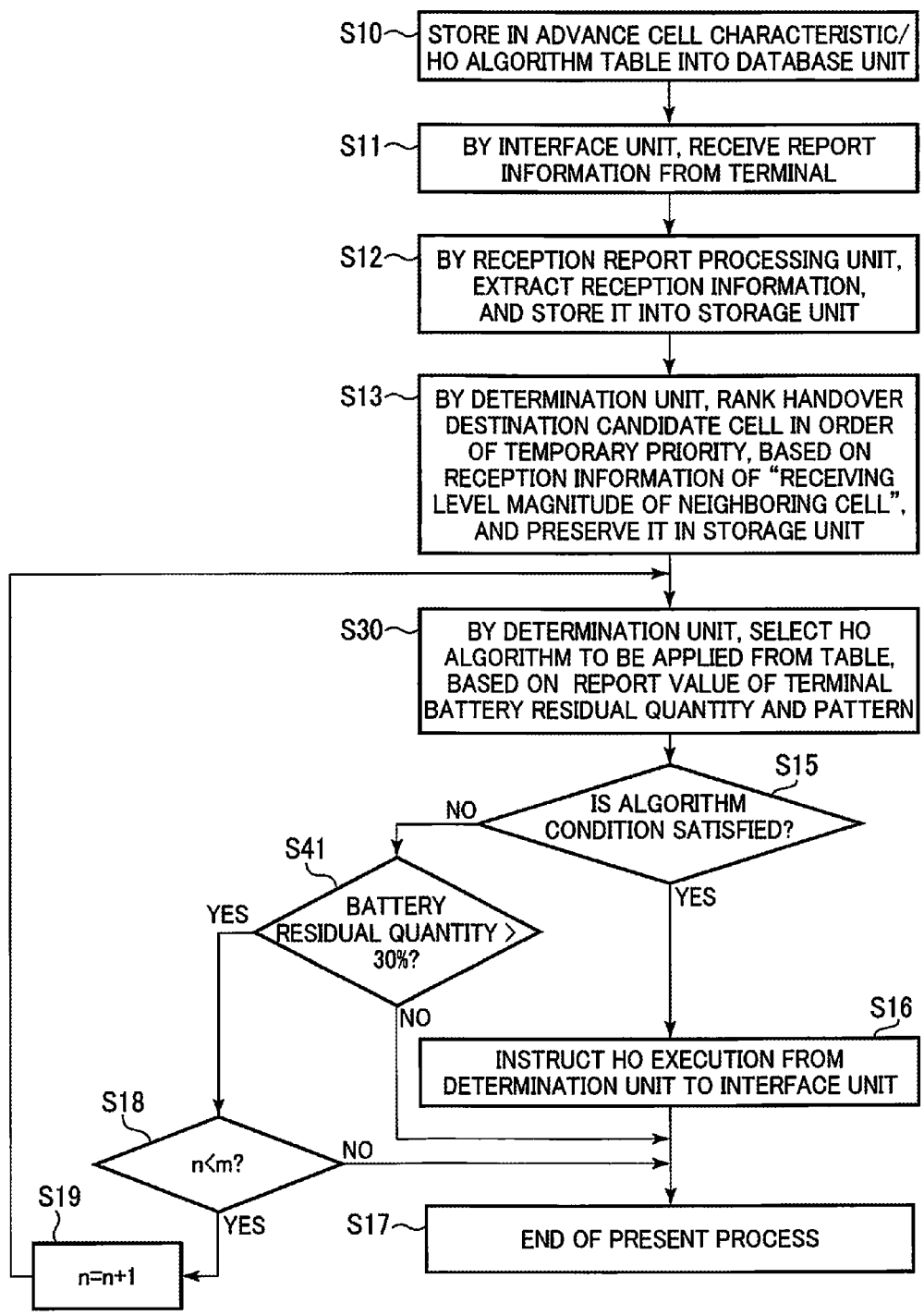
FIG. 16 is a flowchart illustrating an operation example of handover destination decision processing.

FIG. 16 is a flowchart illustrating an operation example in the present fifth embodiment.

The base station 10 stores "algorithms" corresponding to the above (13) to (16) into the table 1134 (S10), and extracts the receiving signal level and the battery residual quantity information (or battery residual quantity report value) of the terminal 30, similar to the fourth embodiment (S11, S12).

Then, the determination unit 114 temporarily prioritizes the handover destination candidate cells (S13). FIG. 14 illustrates the result of the prioritization by the determination unit 114, for example.

Next, based on the battery residual quantity report value of the terminal 30 and a pattern, the determination unit 114 selects an "algorithm" to be applied from the table 1134 (S30).

For example, the determination unit 114 selects "(3)" as an "algorithm" when the battery residual quantity report value is "40%", a cell whose cell ID is "5" is selected as the first handover destination candidate cell, and the self-cell has a cell ID="1". In "(3)" in the "Algorithms", there is stored "the receiving signal level of a handover destination candidate cell>the receiving signal level of a handover source cell, and the receiving signal level of the handover destination candidate cell>−80 dBm", for example.

With reference back to FIG. 16, the determination unit 114 determines whether or not the algorithm is satisfied (S15). For example, the determination unit 114 determines whether or not the handover condition stored in "(3)" is satisfied as an "algorithm". In this case, because the receiving signal level "−81 dBm" of the first handover destination candidate cell does not satisfy the condition of "the receiving signal level of the handover destination candidate cell>−80 dBm", the determination unit 114 determines that the handover condition is not satisfied (No in S15).

When the algorithm is not satisfied (No in S15), the determination unit 114 determines whether or not the battery residual quantity of the terminal 30 exceeds "30%" (S41).

For example, if a handover destination candidate cell ranked at the highest priority does not satisfy a handover condition for a handover destination candidate, a handover destination candidate cell ranked next to the highest priority has a lower receiving signal level. Therefore, when a handover destination candidate cell ranked at the highest priority does not satisfy a handover condition, a receiving signal level becomes lower when a destination candidate cell of lower priority is selected. Accordingly, if the terminal 30 is handed over to such a cell, it is difficult to continuously use the terminal 30, whose battery residual quantity is small, longer than and including a threshold time.

Therefore, when the battery residual quantity of the terminal 30 does not exceed "30%" (No in S41), the determination unit 114, without executing handover, maintains the terminal 30 in a state of being located in the current cell (S17).

On the other hand, when the battery residual quantity of the terminal 30 is "30%" or larger (Yes in S41), if the number of cells of a selection target is smaller than and including the number m of the priority orders, the next priority order (n=n+1) is targeted for selection (S18, S19), so that the above-mentioned processing is repeated. Processing thereafter is similar to the second embodiment.

As such, in the present fifth embodiment, when the battery residual quantity of the terminal 30 is a threshold or smaller, as in the case of (13) described above, for example, there is set a handover condition that enables handing over more easily as compared to a case of other battery residual quantity.

Therefore, in the present fifth embodiment also, handover to a handover destination candidate cell having a higher receiving level becomes easier, similar to the fourth embodiment. This enables the battery use of the terminal 30 longer than a threshold time, for example.

Also, in regard to handover from a large cell to a small cell, there is set a handover condition severer than the normal condition, as described in the above (15) for example. Therefore, in the present fifth embodiment, as the handover condition from the large cell to the small cell is severer than the normal condition, so handover from the large cell to the small cell is more restricted when the battery residual quantity is large, and the exchange of messages related to handover is reduced greater.

Therefore, in the present fifth embodiment, it is possible to achieve both the use of the terminal 30 for a threshold time or longer when the battery residual quantity is small and the reduction of handover messages when the residual quantity is large.

Further, in the present fifth embodiment, the above-mentioned handover strategy can be actualized and the operator can operate the radio communication system 100 in which an operational policy is reflected. To actualize such an operational policy, there may not be additionally install an apparatus in the present radio communication system 100, and cost increase can be avoided accordingly.

Moreover, handover conditions stored in the table 1134 can be changed at the base station 10 according to battery residual quantity and a cell size. Therefore, the operator that operates the base station 10 can take flexible measures as compared to the case of a uniform handover condition, and also can set a handover condition according to battery residual quantity and a cell size. Since no capital investment for the additional installation of an apparatus etc. may be at such a handover condition change, cost increase in the present radio communication system 100 can be avoided.

Incidentally, in regard to the handover conditions of the above-mentioned (13) to (16), the description has been given on the example such that cell sizes are incorporated in the handover condition in the case of "battery residual quantity>30%". However, cell sizes may also be incorporated in the handover conditions even in the case of "battery residual quantity≥30%". Also, in the handover conditions of the above (13) to (16), relationship between the battery residual quantity and the cell size may be modified, and other numerical values may be applicable for the values of the battery residual quantity.

In the present fifth embodiment, for example, the handover condition when battery residual quantity is a threshold or smaller is an easier condition than the normal condition, enabling easy to handover. By this, for example, the terminal 30 can be handed over to a cell having a better receiving signal level condition, so that the terminal 30 can be used for a threshold time or longer.

Also, in the present fifth embodiment, each handover condition when the battery residual quantity exceeds a threshold is set to make a handover more difficult in one of cases from a large cell to a small cell and from a small cell to a large cell, as compared to the other. By this, the transmission of handover messages from a terminal 30 having large battery residual quantity is restricted, so that the number of handover messages can be reduced as compared to the normal condition.

Sixth Embodiment

Next, a sixth embodiment will be described. In the present sixth embodiment, a description will be given on an example in which handover is performed on the basis of a requested throughput from the terminal 30 and a cell size.

An operational policy by the operator is assumed to be "satisfying a throughput requested from the terminal 30". As a handover strategy to actualize the above operational policy, the following is adopted:

"To disable handover to the possible extent when the terminal 30 requests a low throughput, whereas to enable handover of the terminal 30 to a small cell when the terminal 30 requests a high throughput."

For example, in a small cell such as a micro cell, a pico cell and a femto cell, the number of terminals (or the number of users) that can be accommodated in such a small cell is smaller as compared to a large cell such as a macro cell. When there are the same available frequency resources between the small cell and the large cell, the throughput per terminal in the small cell is higher than in the large cell. Therefore, by positively handing over the terminal 30 to the small cell in the base station 10, it is possible to satisfy the requested throughput of the terminal 30.

As a method for actualizing the above-mentioned handover strategy, the following are adopted, for example:

(17) When the terminal 30 requests a throughput of 1 Mbps or lower, handover is executed if "the receiving signal level of the handover destination candidate cell>the receiving signal level of the handover source cell (or self-cell)" and "the receiving signal level of the destination candidate cell>−75 dBm" are satisfied.

(18) When the terminal 30 requests a throughput of 1-3 Mbps, handover is executed if "the receiving signal level of the handover destination candidate cell>the receiving signal level of the handover source cell (or self-cell)" and "the receiving signal level of the destination candidate cell>−80 dBm" are satisfied. Here, the above (17) and (18) are applied also when cell sizes are equivalent between before and after the handover.

(19) When the terminal 30 requests a throughput of 3-5 Mbps, handover is executed if "the size of the handover destination candidate cell is smaller than the size of the handover source cell, and if the receiving signal level of the handover destination candidate cell>the receiving signal level of the handover source cell (or self-cell)" and "the receiving signal level of the destination candidate cell>−75 dBm" are satisfied.

(20) When the terminal 30 requests a throughput of 5 Mbps or higher, handover is executed if "the size of the handover destination candidate cell is smaller than the size of the handover source cell" and "the receiving signal level of the handover destination candidate cell>the receiving signal level of the handover source cell" are satisfied.

As described in the above (20), when the terminal 30 requests a throughput of a threshold or higher, the condition is set to enable easier handover of the terminal 30 to a small-sized cell, as compared to the other conditions.

To actualize the above (17) to (20), for example, in the present sixth embodiment, a table 1135 in which the relationship among a requested throughput, a pattern and a handover condition is defined is stored in the database 113.

In the above (19), the reason for adopting "the receiving signal level of the destination candidate cell>−75 dBm" is to impose a certain restriction on the number of terminals to be handed over to a small cell. For example, if the terminal 30 that requests a high throughput is handed over to a small cell according to the above (20), the number of terminals located in the small cell may be increased to a certain number or greater. The above (19) is intended to impose the certain restriction on the terminal 30 that requests a lower throughput than the throughput specified in the above (20). The above (19) may also be modified to "the receiving signal level of the destination candidate cell>−90 dBm", for example.

FIG. 18B illustrates an example of the table 1135 added in the present six embodiment. As depicted in FIG. 18B, the table 1135 stores each handover condition corresponding to a requested throughput requested from the terminal 30 and a pattern. By this, for example, the base station 10 can control to hand over a terminal 30 that requests a high throughput to a small cell, and control a terminal 30 that requests a low throughput to stay in the self-cell.

Figure 19:
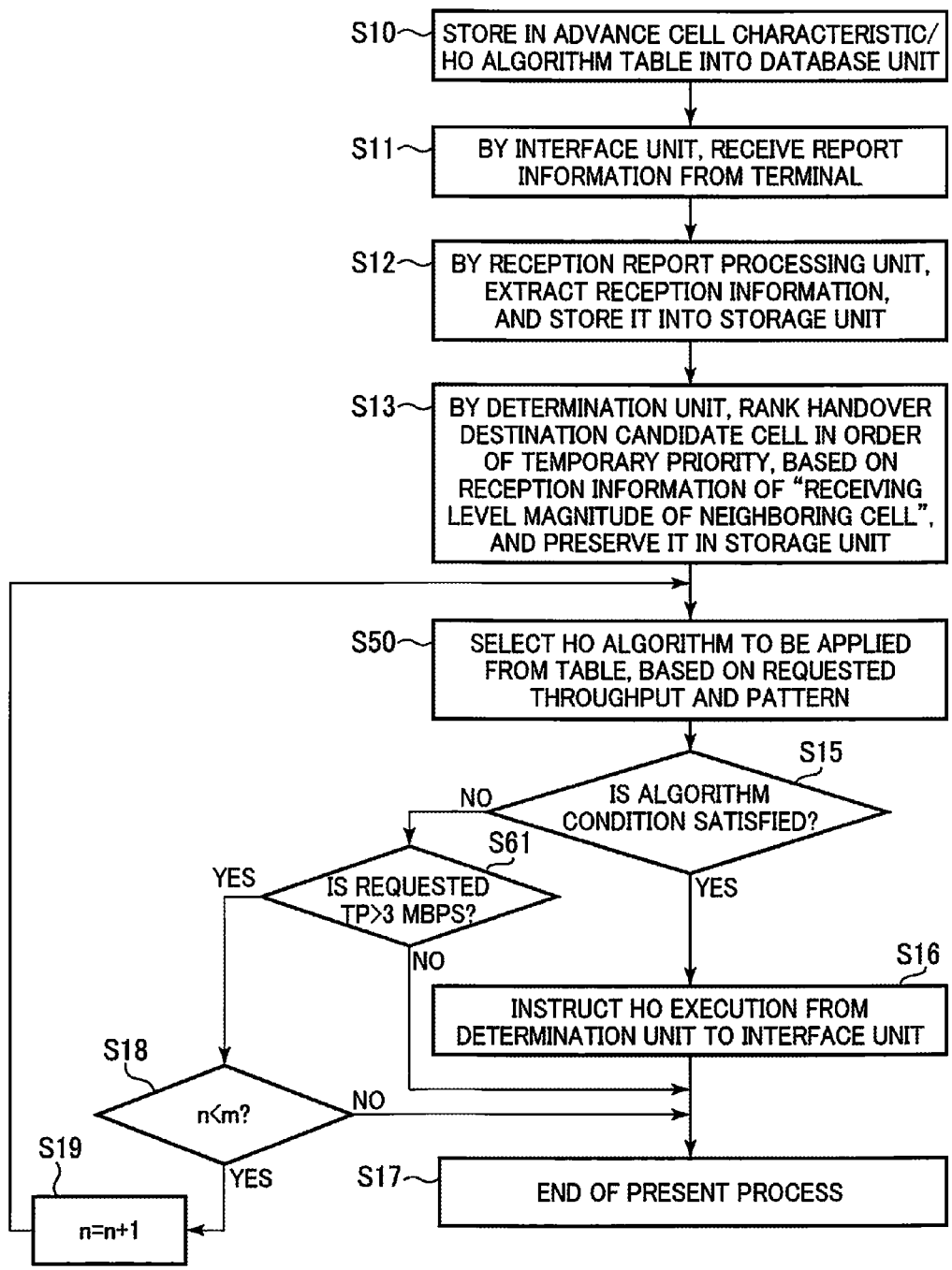
FIG. 19 is a flowchart illustrating an operation example of handover destination decision processing.

FIG. 19 is a flowchart illustrating an operation example in the present sixth embodiment.

The base station 10 stores "algorithms" corresponding to the above (17) to (20) into the table 1134 (S10).

Next, the terminal reception report processing unit 111 stores a requested throughput of the terminal 30 included in report information into the storage unit 112, and outputs a receiving signal level to the determination unit 114.

Next, based on the receiving signal level of the handover destination candidate cell, the determination unit 114 temporarily prioritizes the handover destination candidate cells, so as to store into the table 1120 (S13). FIG. 17A illustrates an example of the table 1120, for example.

Next, from the table 1135, the determination unit 114 selects a handover condition to be applied, on the basis of the requested throughput and the pattern (S50).

For example, the determination unit 114 reads out the requested throughput of the terminal 30 ("4 Mbps", for example) from the storage unit 112. Also, the determination unit 114 pairs the self-cell with the handover destination candidate cell ("A", "B", for example). Then, based on both the requested throughput and a pattern corresponding to the pair ("A→B", for example), the determination unit 114 selects the corresponding "algorithm" ("(3)", for example).

Next, the determination unit 114 determines whether or not the handover condition is satisfied (S15).

For example, when the selected "algorithm" (="(3)") is the above (19), the determination unit 114 determines whether or not the receiving signal level "−86 dBm" of the first (n=1) destination candidate cell (whose cell ID is "5") satisfies the above (19). Here, the receiving signal level of the self-cell is assumed to be "−87 dBm". In this case, the handover condition described in the above (19) is satisfied, and accordingly, the determination unit 114 decides the cell whose cell ID is "5" to be a handover destination (Yes in S15, and S16). Processing thereafter is similar to the second embodiment.

For example, as an "algorithm", "(2)" (=the above (18)) is selected on condition that the requested throughput of the terminal 30 is "1 Mbps" and each receiving signal level of the self-cell and the first (n=1) destination candidate cell (whose cell ID is "5") is the same as the above-mentioned example. In this case, the receiving signal level of the handover destination candidate cell is "−86 dBm", which does not satisfy the handover condition of "the receiving signal level of the destination candidate cell>−80 dBm". Accordingly, the determination unit 114 determines that the handover condition is not satisfied (No in S15).

On not satisfying the handover condition (No in S15), the determination unit 114 determines whether or not the requested throughput exceeds "3 Mbps" (S61).

When the requested throughput is a high throughput that exceeds "3 Mbps" (Yes in S61), for example, if the first (n=1) handover destination candidate cell does not satisfy the handover condition (No in S15), handover to a small cell may be performed if the receiving signal level is in the second or third level from the highest. In such a case, the base station 10 selects a handover destination candidate cell ranked in the (n+1)th order of the temporary priority (S18, S19) to perform processing S50 etc.

On the other hand, when the requested throughput is a low throughput lower than and including "3 Mbps" (No in S61), the base station 10 maintains the terminal 30 in the current cell without execution of handover (S17). By this, it is possible to satisfy the handover strategy of disabling handover to the possible extent in the case a low throughput is requested, for example.

As such, according to the present sixth embodiment, there is set a handover condition that enables easier handover of the terminal 30 as compared to the normal condition, in regard to handover from a large cell to a small cell when the requested throughput of the terminal 30 is a threshold or higher, like the above (19) and (20) for example. Also, according to the present sixth embodiment, there is set a condition that makes the handover of the terminal 30 more difficult as compared to the normal condition when the requested throughput of the terminal 30 is lower than the threshold, as specified in the above (17) for example.

Thus, the present radio communication system 100 can satisfy the above-mentioned handover strategy while satisfying a requested throughput from the terminal 30. By this, it is possible to perform operation in which the operational policy of the operator is reflected. Since no additional installation of an apparatus may achieve the operational policy, cost increase in the present radio communication system 100 can be avoided also.

Also, in the base station 10, each handover condition stored in the table 1135 can be modified according to a requested throughput and a cell size. Therefore, as compared to the case of a uniform handover condition, the operator that operates the base station 10 can take flexible measures, and also can set a handover condition according to the requested throughput and the cell size. Since capital investment for additional installation of an apparatus and the like may not be at the change of such a handover condition, cost increase in the present radio communication system 100 can be avoided.

Another Embodiment

Figure 20:
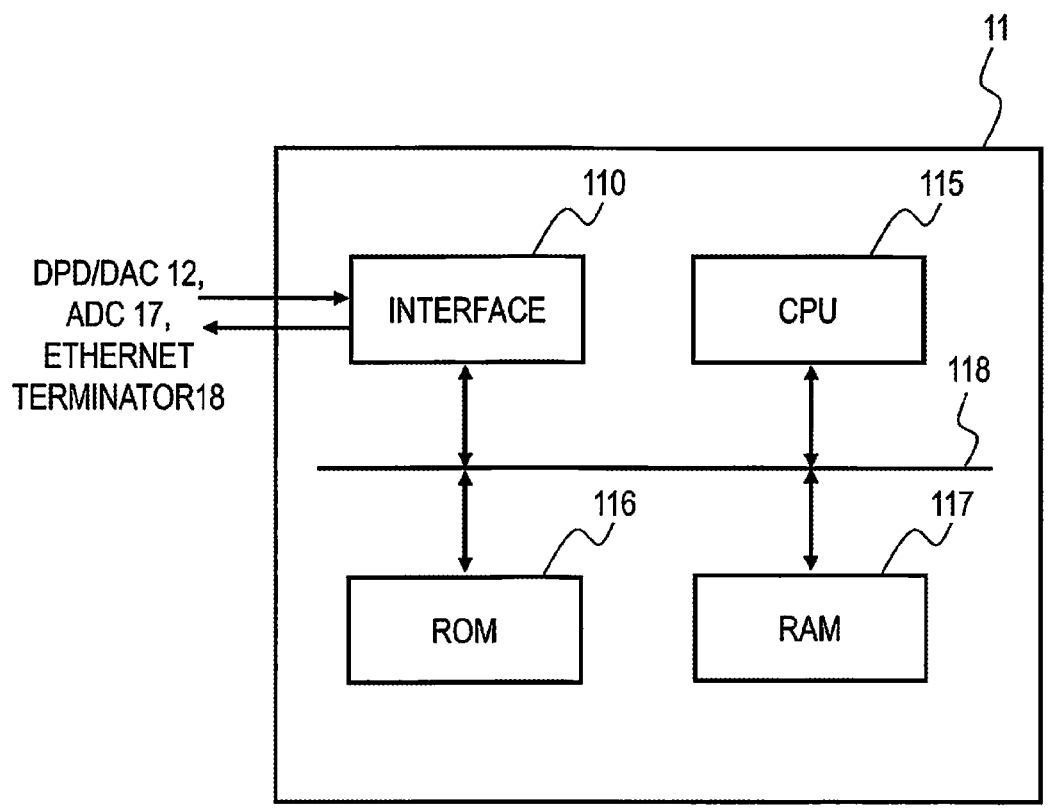
FIG. 20 illustrates a configuration example of a BB unit.

Next, a description will be given on another embodiment. FIG. 20 illustrates a hardware configuration example of the BB unit 11.

The BB unit 11 includes an interface 110, a CPU (Central Processing Unit) 115, a ROM (Read Only Memory) 116 and a RAM (Random Access Memory) 117.

The ROM 116 stores program, so that the CPU 115 reads out the program to load on the RAM 117 and executes the loaded program appropriately. By the execution of the program by the CPU 115, the functions of the terminal reception report processing unit 111 and the determination unit 114 as described in the second embodiment etc. are actualized, for example.

The CPU 115 corresponds to the terminal reception report processing unit 111 and the determination unit 114 of the second embodiment, for example. Also, the RAM 117 corresponds to the storage unit 112 and the database 113 of the second embodiment, for example.

The BB unit 11 depicted in FIG. 20 may also represent an exemplary hardware configuration of the BB unit 31 provided in the terminal 30, for example.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:
1. A radio communication system comprising:
a base station apparatus which includes a first communicable area; and
a terminal apparatus which connects to and performs radio communication with the base station apparatus in the first communicable area, wherein
the base station apparatus includes:
a processor configured to decide a destination of the terminal apparatus based on a changeable movement condition according to sizes of the first, a second, and a third communicable areas or power residual quantity of the terminal apparatus transmitted from the terminal apparatus, when the terminal apparatus moves from the first communicable area to the second or the third communicable area which is a part of the first communication area or includes all of the first communicable area; and
a transmitter configured to transmit information of the decided destination,
the terminal apparatus includes:
a receiver configured to receive the information of the decided destination, and
the terminal apparatus moves to the second or the third communicable area according to the information of the decided destination, wherein the movement condition includes a first and second movement conditions, the first movement condition includes a movement condition in case that the first communicable area is lamer than the second and third communicable areas, and the second movement condition includes a movement condition in case that the first communicable area is smaller than the second and third communicable areas, the first movement condition includes a condition not to move the terminal apparatus in comparison with the second movement condition, the first movement condition is a condition to move the terminal apparatus in case that a receiving signal level of the terminal apparatus in the second and third communicable areas is higher than a receiving signal level of the terminal apparatus in the first communicable area and the receiving signal level of the terminal apparatus in the second and third communicable areas is higher than a first threshold, the second movement condition is a condition to move the terminal apparatus in case that the receiving signal level of the terminal apparatus in the second and third communicable areas is higher than the receiving signal level of the terminal apparatus in the first communicable area and the receiving signal level of the terminal apparatus in the second and third communicable areas is higher than a second threshold, and the first threshold is a threshold of a higher receiving signal level than the second threshold.

2. The radio communication system according to claim 1, wherein the processor is configured to prioritize a first and second receiving signal levels respectively corresponding to the second and third communicable areas respectively, in order from the highest receiving signal level, and decide the destination of the terminal apparatus to the second or the third communicable area in order from the highest receiving signal level, based on the movement condition.

3. The radio communication system according to claim 1, wherein the second communicable area is accommodated in the base station apparatus or another base station apparatus, and the third communicable area is accommodated in the base station apparatus or the other base station apparatus.

4. A radio communication system comprising:

a base station apparatus which includes a first communicable area; and a terminal apparatus which connects to and performs radio communication with the base station apparatus in the first communicable area, wherein the base station apparatus includes:

a processor configured to decide a destination of the terminal apparatus based on a changeable movement condition according to sizes of the first, a second, and a third communicable areas or power residual Quantity of the terminal apparatus transmitted from the terminal apparatus, when the terminal apparatus moves from the first communicable area to the second or the third communicable area which is a part of the first communication area or includes all of the first communicable area; and a transmitter configured to transmit information of the decided destination, the terminal apparatus includes:

a receiver configured to receive the information of the decided destination, and the terminal apparatus moves to the second or the third communicable area according to the information of the decided destination, wherein the movement condition includes a first and second movement conditions, the first movement condition includes a movement condition in case that the first communicable area is lamer than the second and third communicable areas, and the second movement condition includes a movement condition in case that the first communicable area is smaller than the second and third communicable areas, the first movement condition includes a condition to move the terminal apparatus in comparison with the second movement condition, the first movement condition is a condition to move the terminal apparatus in case that a receiving signal level of the terminal apparatus in the second and third communicable areas is higher than a receiving signal level of the terminal apparatus in the first communicable area and the receiving signal level of the terminal apparatus in the second and third communicable areas is higher than a third threshold, the second movement condition is a condition to move the terminal apparatus in case that the receiving signal level of the terminal apparatus in the second and third communicable areas is higher than the receiving signal level of the terminal apparatus in the first communicable area and the receiving signal level of the terminal apparatus in the second and third communicable area is higher than a fourth threshold, and the fourth threshold is a threshold of a higher receiving signal level than the third threshold.

5. A radio communication system comprising:

a base station apparatus which includes a first communicable area; and a terminal apparatus which connects to and performs radio communication with the base station apparatus in the first communicable area, wherein the base station apparatus includes:

a processor configured to decide a destination of the terminal apparatus based on a changeable movement condition according to sizes of the first, a second, and a third communicable areas or power residual Quantity of the terminal apparatus transmitted from the terminal apparatus, when the terminal apparatus moves from the first communicable area to the second or the third communicable area which is a part of the first communication area or includes all of the first communicable area; and a transmitter configured to transmit information of the decided destination, the terminal apparatus includes:

a receiver configured to receive the information of the decided destination, and the terminal apparatus moves to the second or the third communicable area according to the information of the decided destination, wherein the movement condition includes a third and fourth movement conditions, the third movement condition includes a movement condition in case that the power residual quantity is equal or smaller than a fifth threshold, and the fourth movement condition includes a movement condition in case that the power residual quantity is larger than the fifth threshold, the third movement condition includes a condition to move the terminal apparatus in comparison with the fourth movement condition, wherein the third movement condition is a condition to move the terminal apparatus in case that the power residual quantity is smaller than the fifth threshold and a receiving signal level of the terminal apparatus in the second and third communicable areas is higher than a receiving signal level of the terminal apparatus in the first communicable area, or the power residual quantity is smaller than the fifth threshold, the receiving signal level of the terminal apparatus in the second and third communicable areas is higher than the receiving signal level of the terminal apparatus in the first communicable area, and a receiving signal level of the terminal apparatus is higher than a sixth threshold, the fourth movement condition is a condition to move the terminal apparatus in case that the power residual quantity is larger than the fifth threshold, the receiving signal level of the terminal apparatus in the second and third communicable areas is higher than the receiving signal level of the terminal apparatus in the first communicable area, and the receiving signal level of the terminal apparatus is higher than a seventh threshold, and the seventh threshold is a threshold of a higher receiving signal level than the sixth threshold.

6. A radio communication system comprising:

a base station apparatus which includes a first communicable area; and a terminal apparatus which connects to and performs radio communication with the base station apparatus in the first communicable area, wherein the base station apparatus includes:

a processor configured to decide a destination of the terminal apparatus based on a changeable movement condition according to sizes of the first, a second, and a third communicable areas or power residual quantity of the terminal apparatus transmitted from the terminal apparatus, when the terminal apparatus moves from the first communicable area to the second or the third communicable area which is a part of the first communication area or includes all of the first communicable area; and a transmitter configured to transmit information of the decided destination, the terminal apparatus includes:

a receiver configured to receive the information of the decided destination, and the terminal apparatus moves to the second or the third communicable area according to the information of the decided destination, wherein the movement condition includes fifth and sixth movement conditions based on the power residual quantity and the sizes of the first to the third communicable areas, the fifth movement condition includes a movement condition in case that the power residual quantity is equal or smaller than a fifth threshold, and the sixth movement condition includes a condition not to move the terminal apparatus in any one case, in comparison with the other, that the power residual quantity is larger than the fifth threshold and the first communicable area is larger than the second and third communicable areas, or the power residual quantity is larger than the fifth threshold and the first communicable area is smaller than the second and third communicable areas.

7. The radio communication system according to claim 6, wherein the fifth movement condition is a condition to move the terminal apparatus in case that the power residual quantity is equal or smaller than the fifth threshold and a receiving signal level of the terminal apparatus in the second and third communicable areas is higher than a receiving signal level of the terminal apparatus in the first communicable area, or the power residual quantity is equal or smaller than the fifth threshold, the receiving signal level of the terminal apparatus in the second and third communicable areas is higher than the receiving signal level of the terminal apparatus in the first communicable area, and a receiving signal level of the terminal apparatus is higher than a seventh threshold, the sixth movement condition is a condition to move the terminal apparatus in case that the power residual quantity larger than the fifth threshold, the receiving signal level of the terminal apparatus in the second and third communicable areas is higher than the receiving signal level of the terminal apparatus in the first communicable area, and the receiving signal level of the terminal apparatus in the second and third communicable areas, in any one case that the first communicable area is larger than the second and third communicable areas or the first communicable area is smaller than the second and third communicable areas, is higher than an eighth threshold, and the eighth threshold is a threshold of a higher receiving signal level than the seventh threshold.

8. A radio communication system comprising:

a base station apparatus which includes a first communicable area; and a terminal apparatus which connects to and performs radio communication with the base station apparatus in the first communicable area, wherein the base station apparatus includes:

a processor configured to decide a destination of the terminal apparatus based on a changeable movement condition according to sizes of the first, a second, and a third communicable areas or power residual quantity of the terminal apparatus transmitted from the terminal apparatus, when the terminal apparatus moves from the first communicable area to the second or the third communicable area which is a part of the first communication area or includes all of the first communicable area; and a transmitter configured to transmit information of the decided destination, the terminal apparatus includes:

a receiver configured to receive the information of the decided destination, and the terminal apparatus moves to the second or the third communicable area according to the information of the decided destination, wherein the movement condition includes seventh and eighth movement conditions according to the sizes of the first to third communicable areas and a requested throughput transmitted from the terminal apparatus, the seventh movement condition includes a condition not to move the terminal apparatus in case that the requested throughput is equal or lower than a ninth threshold and the first communicable area is larger than the second and third communicable areas, in comparison case that the requested throughput is equal or lower than a ninth threshold and the first communicable area is smaller than the second and third communicable areas, and the eighth movement condition includes a movement condition in case that the requested throughput higher than a tenth threshold.

9. The radio communication system according to claim 8, wherein the seventh movement condition is a condition to move the terminal apparatus in case that the requested throughput is equal or lower than the ninth threshold, a receiving signal level of the terminal apparatus in the second and third communicable areas is higher than a receiving signal level of the terminal apparatus in the first communicable area, and a receiving signal level of the terminal apparatus is higher than an eleventh threshold, the eighth movement condition is a condition to move the terminal apparatus in case that the requested throughput higher than a tenth threshold and a receiving signal level of the terminal apparatus in the second and third communicable areas is higher than a receiving signal level of the terminal apparatus in the first communicable area, or the requested throughput higher than the tenth threshold, the receiving signal level of the terminal apparatus in the second and third communicable areas is higher than the receiving signal level of the terminal apparatus in the first communicable area, and the receiving signal level of the terminal apparatus is higher than a twelfth threshold, and the eleventh threshold is a threshold of a higher receiving signal level than the twelfth threshold.

10. A radio communication control method in a radio communication system including a base station apparatus which includes a first communicable area and a terminal apparatus which connects to and performs radio communication with the base station apparatus in the first communicable area, the method comprising:

deciding a destination of the terminal apparatus based on a changeable movement condition according to sizes of the first, a second, and a third communicable areas or power residual quantity of the terminal apparatus transmitted from the terminal apparatus, when the terminal apparatus moves from the first communicable area to the second or the third communicable area which is a part of the first communication area or includes all of the first communicable area, by the base station apparatus;

transmitting information of the decided destination, by the base station apparatus; and receiving the information of the decided destination, and moving to the second or the third communicable area according to the information of the decided destination, by the terminal apparatus, wherein the movement condition includes a first and second movement conditions, the first movement condition includes a movement condition in case that the first communicable area is lamer than the second and third communicable areas, and the second movement condition includes a movement condition in case that the first communicable area is smaller than the second and third communicable areas, the first movement condition includes a condition not to move the terminal apparatus in comparison with the second movement condition, the first movement condition is a condition to move the terminal apparatus in case that a receiving signal level of the terminal apparatus in the second and third communicable areas is higher than a receiving signal level of the terminal apparatus in the first communicable area and the receiving signal level of the terminal apparatus in the second and third communicable areas is higher than a first threshold, the second movement condition is a condition to move the terminal apparatus in case that the receiving signal level of the terminal apparatus in the second and third communicable areas is higher than the receiving signal level of the terminal apparatus in the first communicable area and the receiving signal level of the terminal apparatus in the second and third communicable areas is higher than a second threshold, and the first threshold is a threshold of a higher receiving signal level than the second threshold.

11. A base station apparatus including a first communicable area for connecting to and performing radio communication with a terminal apparatus in the first communicable area, the base station apparatus comprising:

a processor configured to decide a destination of the terminal apparatus based on a changeable movement condition according to sizes of the first, a second, and a third communicable areas or power residual quantity of the terminal apparatus transmitted from the terminal apparatus, when the terminal apparatus moves from the first communicable area to the second or the third communicable area which is a part of the first communication area or includes all of the first communicable area; and a transmitter configured to transmit information of the decided destination to the terminal apparatus, wherein the movement condition includes a first and second movement conditions, the first movement condition includes a movement condition in case that the first communicable area is larger than the second and third communicable areas, and the second movement condition includes a movement condition in case that the first communicable area is smaller than the second and third communicable areas, the first movement condition includes a condition not to move the terminal apparatus in comparison with the second movement condition, the first movement condition is a condition to move the terminal apparatus in case that a receiving signal level of the terminal apparatus in the second and third communicable areas is higher than a receiving signal level of the terminal apparatus in the first communicable area and the receiving signal level of the terminal apparatus in the second and third communicable areas is higher than a first threshold, the second movement condition is a condition to move the terminal apparatus in case that the receiving signal level of the terminal apparatus in the second and third communicable areas is higher than the receiving signal level of the terminal apparatus in the first communicable area and the receiving signal level of the terminal apparatus in the second and third communicable areas is higher than a second threshold, and the first threshold is a threshold of a higher receiving signal level than the second threshold.

\* \* \* \* \*